United States Patent
Matsunobu et al.

(10) Patent No.: US 10,171,794 B2
(45) Date of Patent: Jan. 1, 2019

(54) METHOD FOR SELECTING CAMERAS AND IMAGE DISTRIBUTION SYSTEM CAPABLE OF APPROPRIATELY SELECTING CAMERAS

(71) Applicant: Panasonic Intellectual Property Management Co., Ltd., Osaka (JP)

(72) Inventors: Toru Matsunobu, Osaka (JP); Toshiyasu Sugio, Osaka (JP); Tatsuya Koyama, Kyoto (JP); Satoshi Yoshikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 224 days.

(21) Appl. No.: 15/075,220

(22) Filed: Mar. 21, 2016

(65) Prior Publication Data

US 2016/0323559 A1    Nov. 3, 2016

Related U.S. Application Data

(60) Provisional application No. 62/154,138, filed on Apr. 29, 2015.

(30) Foreign Application Priority Data

Dec. 9, 2015    (JP) ................................. 2015-240655

(51) Int. Cl.
| | | |
|---|---|---|
| *H04N 13/02* | (2006.01) |
| *H04N 13/04* | (2006.01) |
| *H04N 13/243* | (2018.01) |
| *H04N 13/296* | (2018.01) |

(52) U.S. Cl.
CPC ......... *H04N 13/243* (2018.05); *H04N 13/296* (2018.05)

(58) Field of Classification Search
None
See application file for complete search history.

(56) References Cited

U.S. PATENT DOCUMENTS

| | | | | |
|---|---|---|---|---|
| 2007/0182818 A1* | 8/2007 | Buehler | ........... | G08B 13/19602 348/143 |
| 2007/0279494 A1* | 12/2007 | Aman | ................... | G01S 3/7864 348/169 |
| 2014/0267775 A1* | 9/2014 | Lablans | ................. | H04N 5/247 348/169 |
| 2015/0116502 A1* | 4/2015 | Um | ........................ | H04N 7/181 348/169 |

FOREIGN PATENT DOCUMENTS

| | | |
|---|---|---|
| JP | 2002-165200 | 6/2002 |
| JP | 2012-094990 | 5/2012 |

\* cited by examiner

*Primary Examiner* — Kate H Luo
(74) *Attorney, Agent, or Firm* — Greenblum & Bernstein, P.L.C.

(57) ABSTRACT

In a method, M (M is a natural number smaller than N) cameras capturing images to be displayed are selected from N (N is a natural number equal to or larger than 2) cameras capturing images of a same scene. The method includes obtaining positions and image capture angles of the N cameras and selecting M cameras from the N cameras on the basis of the obtained positions and image capture angles of the N cameras.

15 Claims, 26 Drawing Sheets

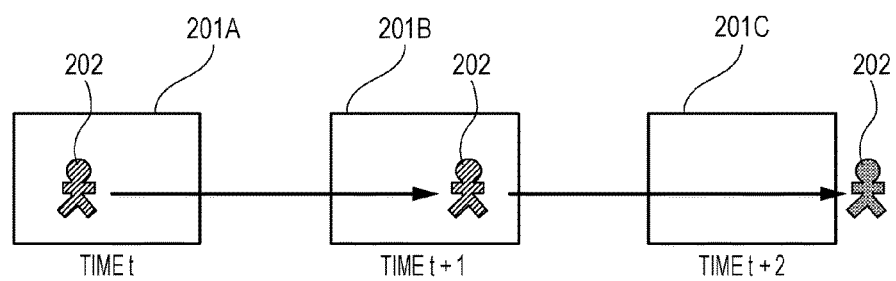
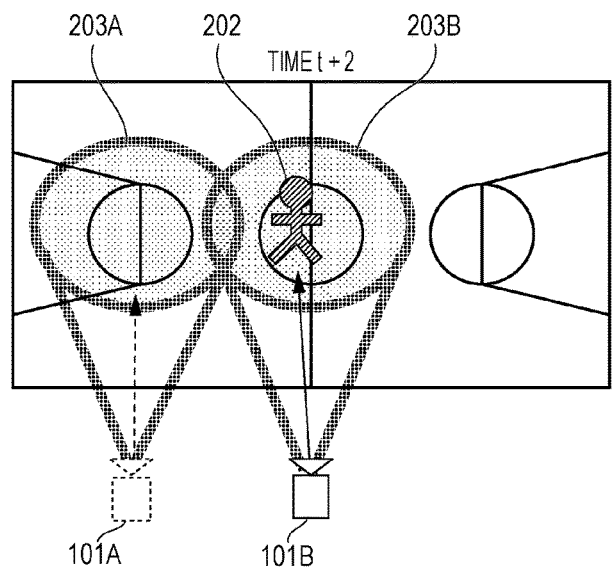

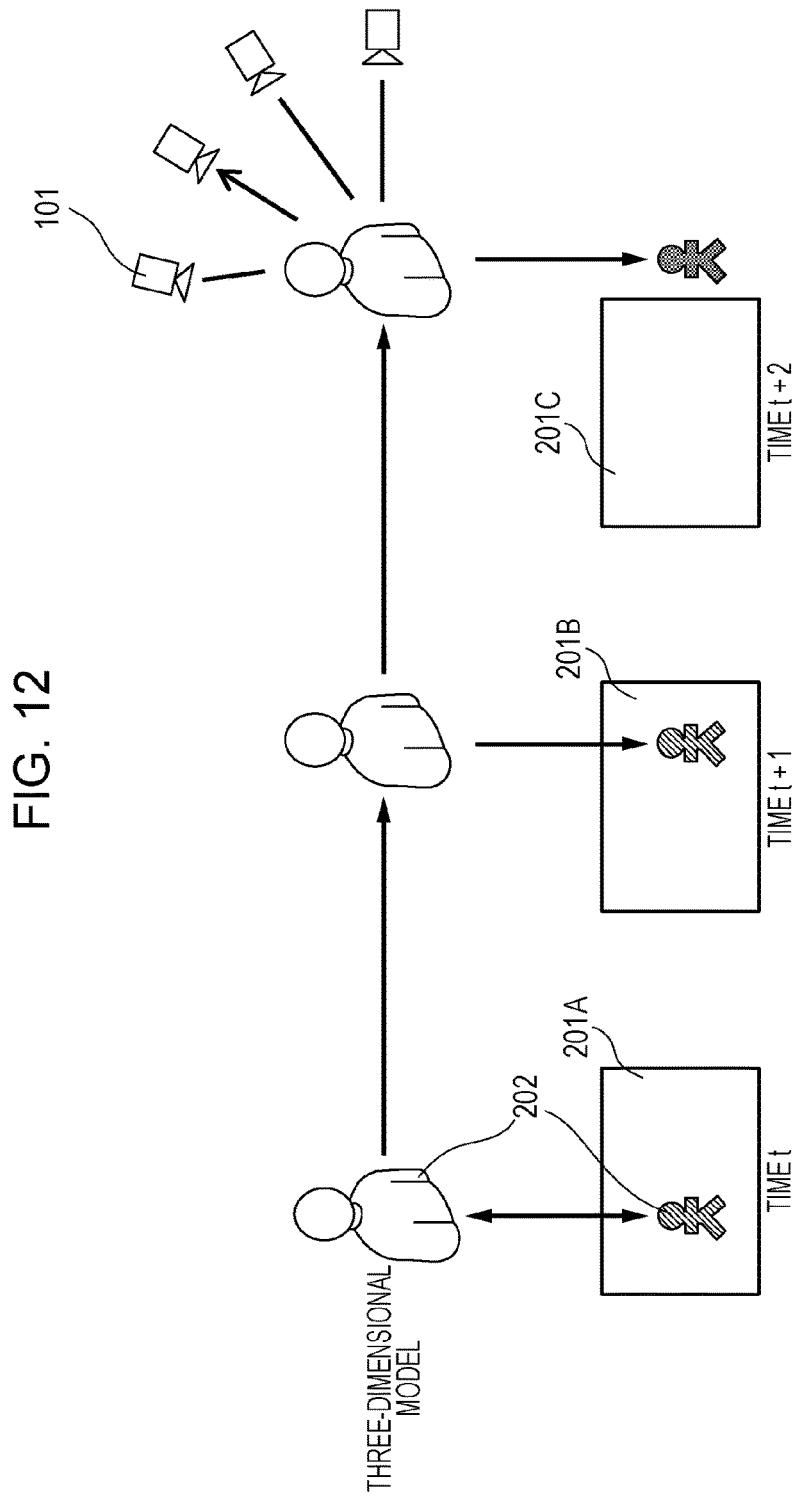

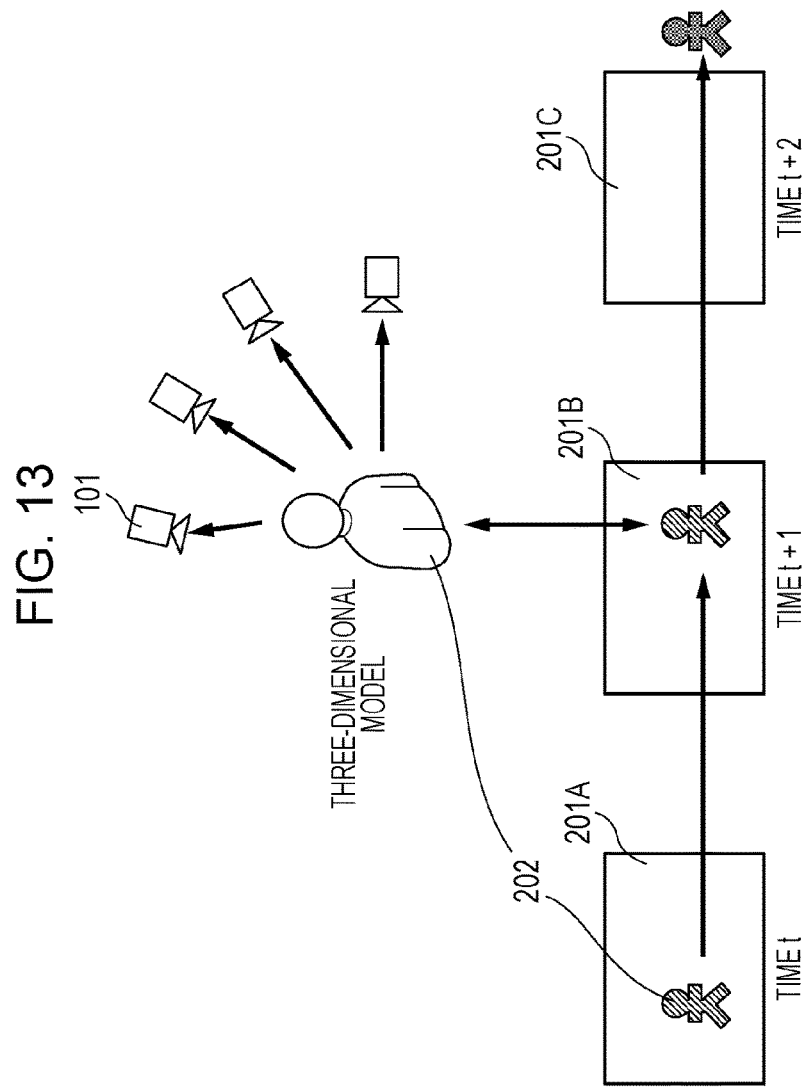

12
METHOD FOR SELECTING CAMERAS AND IMAGE DISTRIBUTION SYSTEM CAPABLE OF APPROPRIATELY SELECTING CAMERAS

BACKGROUND

1. Technical Field

The present disclosure relates to a method for selecting cameras by which cameras capturing images to be displayed are selected from a plurality of cameras capturing the same scene.

2. Description of the Related Art

As a method for distributing images, a technique for controlling image capture conditions of cameras in a multi-view image distribution system is disclosed in Japanese Unexamined Patent Application Publication No. 2002-165200. In addition, a technique for distributing images captured from a plurality of points of view in accordance with movement of the points of view is disclosed in Japanese Unexamined Patent Application Publication No. 2012-094990.

SUMMARY

In the above examples of the related art, however, a method for selecting cameras from a large number of cameras is not described.

One non-limiting and exemplary embodiment provides a method for selecting cameras and an image distribution system capable of appropriately selecting cameras.

In one general aspect, the techniques disclosed here feature a method for selecting cameras. The method includes obtaining, using sensors included in N (N is a natural number equal to or larger than 2) cameras capturing images of a same scene, positions and image capture angles of the N cameras, and selecting M (M is a natural number smaller than N) cameras capturing images to be displayed from the N cameras by using a processor on the basis of the obtained positions and image capture angles of the N cameras.

It should be noted that general or specific embodiments may be implemented as a system, a method, an integrated circuit, a computer program, a computer-readable storage medium such as a compact disc read-only memory (CD-ROM), or any selective combination thereof.

According to the present disclosure, a method for selecting cameras and an image distribution system capable of appropriately selecting cameras can be provided.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 is a diagram illustrating an operation for tracking a subject using two-dimensional images according to the embodiment;

FIG. 11 is a diagram illustrating the operation for tracking a subject using two-dimensional images according to the embodiment;

FIG. 12 is a diagram illustrating an operation for tracking the subject using three-dimensional models according to the embodiment;

FIG. 13 is a diagram illustrating an operation for tracking the subject using two-dimensional images and three-dimensional models according to the embodiment;

DETAILED DESCRIPTION

Figure 1:
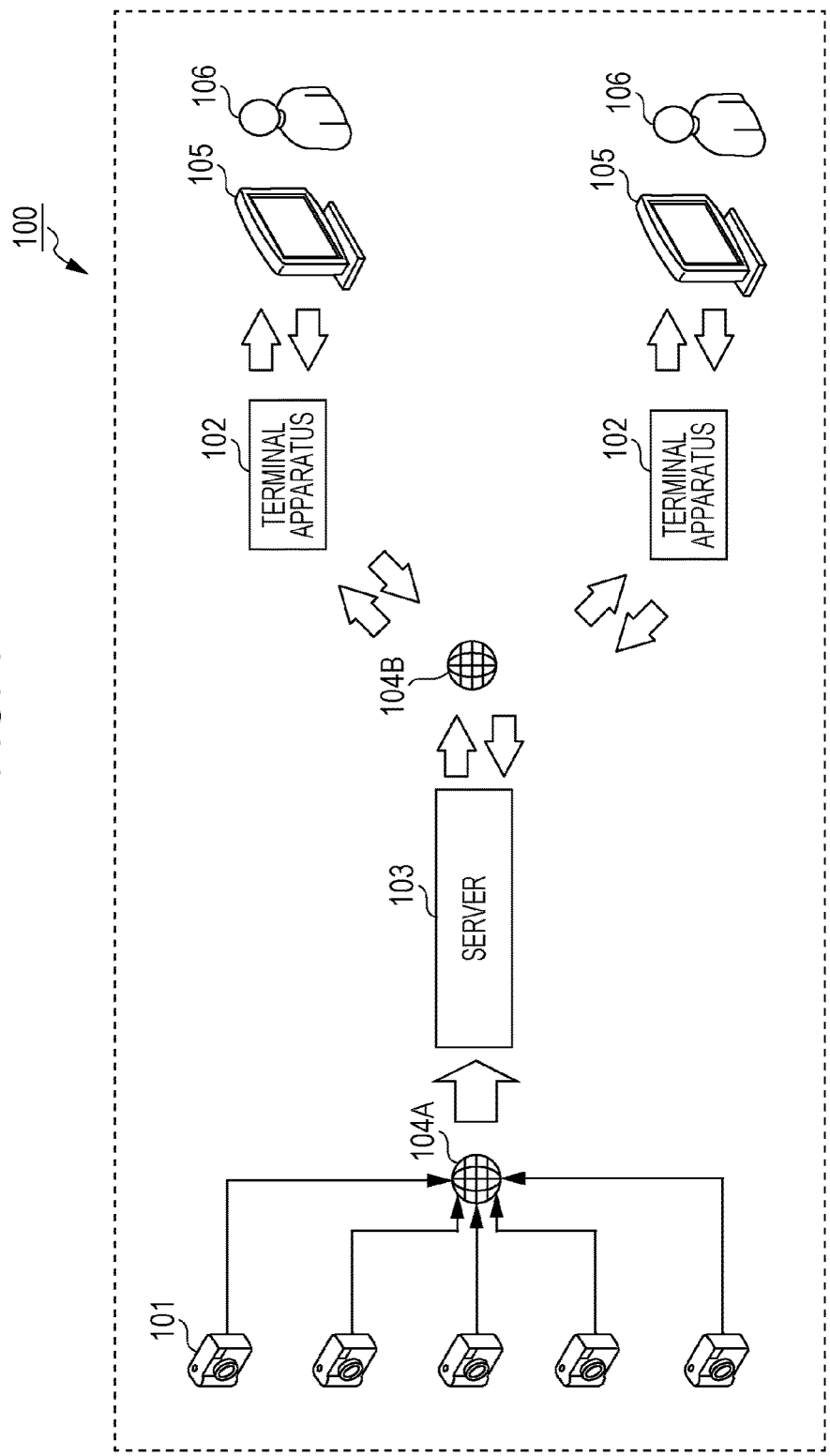
FIG. 1 is a diagram illustrating the configuration of an image distribution system according to an embodiment.

Underlying Knowledge Forming Basis of the Present Disclosure

As an image distribution system, for example, a system is assumed in which images captured by a plurality of cameras (e.g., smartphones) owned by a plurality of users are saved to a server and distributed to a viewer. In such a system, an enormous number of images are stored in the server, but the number of images that can be displayed on a terminal apparatus owned by the viewer is limited.

In this case, it is difficult for the viewer to check all the images and select desired images. In addition, types (functions) of the plurality of cameras owned by the plurality of users are different from one another.

A method for selecting cameras according to an aspect of the present disclosure is a method for selecting cameras. The method includes obtaining, using sensors included in N (N is a natural number equal to or larger than 2) cameras capturing images of a same scene, positions and image capture angles of the N cameras, and selecting M (M is a natural number smaller than N) cameras capturing images to be displayed from the N cameras by using a processor on the basis of the obtained positions and image capture angles of the N cameras.

According to the method for selecting cameras, cameras can be selected on the basis of positions and image capture angles of a plurality of cameras.

For example, in the selecting, M cameras whose images hardly overlap with one another and whose images include a target space most comprehensively may be selected on the basis of the positions and image capture angles of the N cameras.

In this case, a plurality of cameras can be selected such that the plurality of cameras cover the entirety of a target area.

For example, in the selecting, M cameras capturing images of a target space or a subject from a plurality of angles at regular intervals may be selected on the basis of the positions and image capture angles of the N cameras.

In this case, a plurality of cameras can be selected such that the plurality of cameras capture images of the subject from various angles.

For example, in the obtaining, the positions and image capture angles of the N cameras may be calculated by performing three-dimensional reconfiguration using the images captured by the N cameras.

In this case, fields of view of the cameras can be accurately identified.

For example, in the obtaining, the positions and image capture angles of the N cameras may be calculated using information obtained by the sensors included in the N cameras and transmitted from the N cameras.

In this case, the positions and image capture angles of the cameras can be easily identified.

For example, in the obtaining, focal distances of the N cameras may also be obtained. In the selecting, M cameras may be selected from the N cameras on the basis of the obtained positions, image capture angles, and focal distances of the N cameras.

In this case, the fields of view of the cameras can be accurately identified.

For example, the method may further include determining whether to switch at least one of the selected M cameras to another camera in a frame after the selecting; and selecting, if it is determined in the determining that the at least one of the selected M cameras is to be switched, a new camera for the at least one of the selected M cameras on the basis of the positions and image capture angles of the N cameras.

In this case, the amount of processing can be smaller than when all the cameras are switched.

For example, in the determining, a subject may be tracked over frames and, if the tracking of the subject fails, it may be determined that the at least one of the selected M cameras is to be switched.

For example, in the determining, three-dimensional models of the subject may be associated with one another between the frames, the associated three-dimensional models of the subject may be projected onto a present frame, and, if the subject is not included in an obtained frame, it may be determined that the tracking has failed.

In this case, the subject can be accurately tracked.

For example, the method may further include determining whether to perform the selecting again in the frame after the selecting, and selecting, if it is determined in the determining whether to perform the selecting again that the selecting is to be performed again, M cameras are selected from the N cameras again on the basis of the positions and image capture angles of the N cameras.

For example, in the determining whether to switch at least one of the selected M cameras to another camera, if time elapsed since a previous switching operation is shorter than a first time, it may be determined that the at least one of the selected M cameras is not to be switched to another camera, if the time elapsed since the previous switching operation is equal to or longer than the first time but shorter than a second time, which is longer than the first time, it may be determined in accordance with a first criterion whether to switch the at least one of the selected M cameras is to be switched to another camera, and if the time elapsed since the previous switching operation is equal to or longer than the second time, it may be determined whether to switch the at least one of the selected M cameras to another camera in accordance with a second criterion, according to which the at least one of the selected M cameras is more likely to be switched to another camera than when the first criterion is used.

In this case, it is possible to prevent selected cameras from being switched too frequently.

For example, the selecting may include calculating first evaluation values of the N cameras on the basis of the images captured by the N cameras, calculating second evaluation values of camera groups, which are combinations of M cameras included in the N cameras, on the basis of the positions and image capture angles of the N cameras, calculating a third evaluation value of each camera group on the basis of the first evaluation values of the M cameras included in each camera group and the second evaluation value of each camera group, and selecting the M cameras included in a camera group having a highest third evaluation value.

In this case, cameras can be appropriately selected on the basis of the evaluation values based on the images captured by the cameras and the evaluation values based on the positions and image capture angles of the cameras.

In addition, an image distribution system includes a processor and a memory having thereon a program. The program causes the processor to execute operations including obtaining, using sensors included in N (N is a natural number equal to or larger than 2) cameras capturing images of a same scene, positions and image capture angles of the N cameras, and selecting M (M is a natural number smaller than N) cameras capturing images to be displayed from the N cameras on the basis of the obtained positions and image capture angles of the N cameras.

In this case, the image distribution system can appropriately select cameras on the basis of positions and image capture angles of a plurality of cameras.

It should be noted that general or specific aspects may be implemented as a system, a method, an integrated circuit, a computer program, a computer-readable storage medium such as a CD-ROM, or any selective combination thereof.

An embodiment will be specifically described hereinafter with reference to the drawings. The following embodiment is an example of the present disclosure. Values, shapes, materials, components, arrangement positions and connection modes of the components, steps, order of the steps, and the like are examples, and do not limit the present disclosure. Among the components described in the following embodiment, those not described in independent claims, which define broadest concepts, are described as arbitrary components.

Embodiment (1) In a method for selecting cameras according to the present embodiment, cameras capturing M images that can be displayed by a display application or the like are initially selected from N cameras on the basis of estimated positions and attitudes (image capture angles) of cameras. In this method, it is determined for each of the selected M cameras whether camera switching is necessary, and if so, a new camera is selected from N−M cameras.

If all the selected M cameras are reset in this method, cameras are newly selected.

The total number of cameras, which is denoted by N, and the number of cameras initially selected, which is denoted by M, may be increased or decreased as necessary.

(2) In order to estimate the positions and attitudes of the cameras, a method in which N or fewer images are used, a method in which sensor information regarding the cameras is used, or a method in which both are used is executed.

(3) In order to perform the initial selection, a method in which images of an image capture target space is captured without a blind spot, a method in which images of a particular subject are captured from a plurality of angles, or a method including both is executed.

(4) Scenes in the M images or movement of the cameras is checked at arbitrary time intervals in order to determine whether to switch each of the selected M cameras. The number of cameras to be switched, for example, is 1 to M. If a camera is to be switched, a camera capturing an image of a scene similar to a scene whose image has been captured by the foregoing camera is selected. Alternatively, two or more cameras may be newly selected for one camera to be switched.

If 2 to (M−1) cameras are to be switched, the same selection process for switching a camera is performed for each of the cameras. If M cameras are to be switched, the same process as in the initial selection is performed. At this time, M may be increased or decreased.

As a result, even if there are an enormous number of viewable images, multi-view image content valuable to a viewer can be distributed without necessitating the viewer, a server manager, an image manager, and an image monitor to perform extra operations.

First, the configuration of an image distribution system 100 according to the present embodiment will be described. FIG. 1 is a block diagram illustrating the overall configuration of the image distribution system 100 according to the present embodiment. The image distribution system 100 includes a plurality of cameras 101, terminal apparatuses 102, and a server 103 capable of communicating with one another through a network 104A or 104B.

The cameras 101 generate a plurality of images of the same scene captured in the same time period from different points of view. Each of the cameras 101 is owned by one of a plurality of users. The cameras 101, for example, are owned by a plurality of spectators in a stadium or the like. The cameras 101 capture images and obtain sounds. In addition to capturing images, the cameras 101 obtain sensor information, which is information other than the images, indicating positional information and attitude information (image capture angles) regarding the cameras 101 using a Global Positioning System (GPS), Wi-Fi (registered trademark), gyro sensors, or the like. The cameras 101 may be any devices at least having a function of capturing an image and, for example, may be digital still cameras, digital video cameras, smartphones, mobile terminals, or the like. The cameras 101 may include not only cameras owned by the spectators but also a fixed camera or a broadcast camera. The cameras 101 transmit the captured images, the obtained sounds, and the sensor information to the server 103 through the network 104A.

In the present embodiment, the cameras 101 are digital cameras or smartphones owned by the users, for example, and types (functions) of the cameras 101 are different from one another.

The networks 104A and 104B, for example, are the Internet. Although the networks 104A and 104B are separately illustrated in FIG. 1, the cameras 101, the terminal apparatuses 102, and the server 103 may be connected to one another through a single network, instead. Part or the entirety of the communication between the devices may be performed directly, not through the network 104A or 104B. The devices may be connected to one another by wire or wirelessly.

The server 103 is used for temporarily storing the images captured by the cameras 101. The server 103 then distributes part of the images stored therein to the terminal apparatuses 102 through the network 104B in accordance with instructions issued by users 106 through the terminal apparatuses 102. At this time, the server 103 executes a selection method in which camera information is used in order to select a number of images that can be played back by the terminal apparatuses 102 from an enormous number of images. The camera information indicates positions, image capture angles, and focal distances of the cameras 101. The camera information is information registered to the server 103 in advance, the sensor information obtained along with the images, information calculated by processing the images, or information calculated using the sensor information and the image information. The selection method is the method in which images of an image capture target space are captured without a blind spot, the method in which images of a particular subject are captured from a plurality of angles, or both. The camera information may include information regarding an angle of view (zoom magnification) as well as the above information.

The server 103 performs processes such as switching of images in accordance with instructions from the users 106 or results of analyses of a scene whose images have been captured or movement of the cameras 101.

Each of the terminal apparatuses 102 receives images from the server 103 in accordance with an instruction from the corresponding user 106 and outputs the images to a corresponding monitor 105 using a method according to an instruction from the user 106. The monitors 105 may be output devices of any type, such as monitors of desktop personal computers (PCs), tablet terminals, smartphones, mobile phones, or laptop PCs. Although the terminal apparatuses 102 and the monitors 105 are separately illustrated in FIG. 1, the terminal apparatuses 102 may include the monitors 105.

The users 106 issue instructions by touching screens or using mice, for example, but input devices of any type may be used.

The instructions from the users 106 are transmitted to the server 103. The instructions from the users 106 are used as triggers to cause the server 103 to start to distribute images and to switch images. The server 103 determines a method for selecting images on the basis of an instruction from a user 106.

Audio data need not necessarily be obtained by all the cameras 101. The image distribution system 100 may include a microphone that obtains only sound. The server 103 may distribute sounds accompanying selected images to the terminal apparatuses 102, select a sound obtained by a camera 101 (or a microphone) closest to a target area or a subject, select a sound having highest quality from the obtained sounds, or create a sound to be distributed by combining a plurality of sounds with one another.

The cameras 101 may transmit a plurality of images in real-time, and the users 106 may view the images in real-time using the terminal apparatuses 102. At least the transmission of the images or the viewing of the images need not be performed in real-time. That is, the users 106 may view images captured in the past at arbitrary timings. Transmission and reception of image signals (images) described in the following description mainly refer to stream transmission and reception, in which the image signals are continuously transmitted and received.

Figure 2:
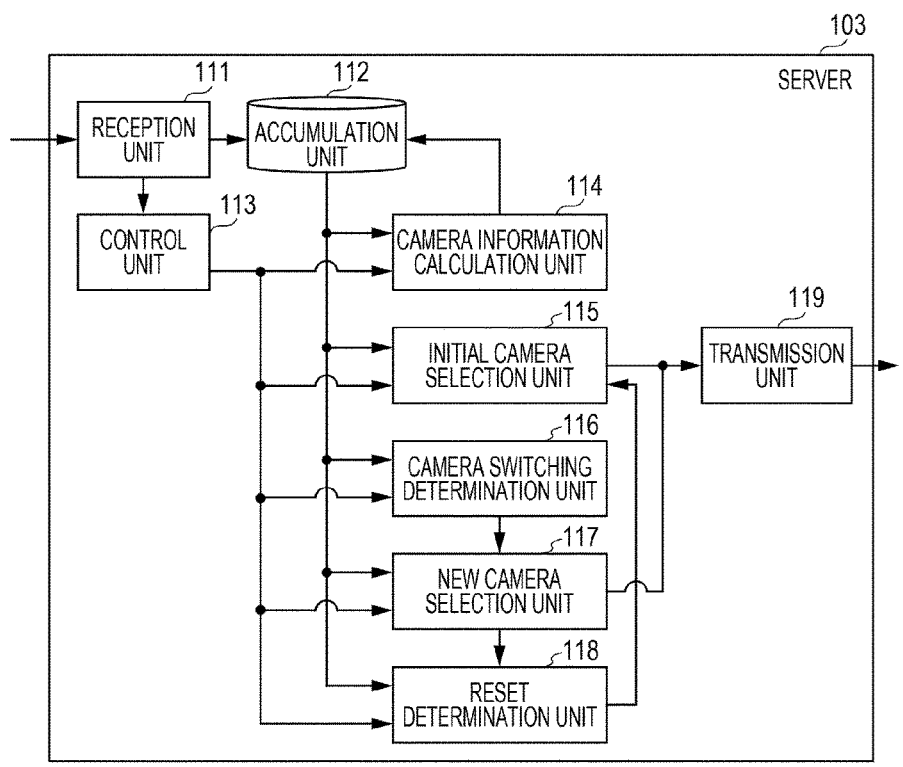
FIG. 2 is a block diagram illustrating a server according to the embodiment.

Next, the configuration of the server 103 will be described. FIG. 2 is a block diagram illustrating the configuration of the server 103. The server 103 includes a reception unit 111, an accumulation unit 112, a control unit 113, a camera information calculation unit 114, an initial camera selection unit 115, a camera switching determination unit 116, a new camera selection unit 117, a reset determination unit 118, and a transmission unit 119.

The reception unit 111 receives images and sensor information transmitted from the cameras 101. The accumulation unit 112 adds identification (ID) information for identifying the cameras 101 to the images and the sensor information received by the reception unit 111 and stores the ID information. The sensor information is output from Wi-Fi, the GPS, gyro sensors, or the like and identifies positions and attitudes of the cameras 101. The accumulation unit 112 stores the positions and attitudes of the cameras 101 calculated by the camera information calculation unit 114 using the images and the sensor information.

The accumulation unit 112 may store the images and the sensor information received by the reception unit 111 or, for example, may divide the images into frames and store frames at the same point of time as a set in order to enable the camera information calculation unit 114 to perform three-dimensional reconfiguration.

The control unit 113 controls each processing unit.

The camera information calculation unit 114 obtains a plurality of images from the accumulation unit 112 and calculates positions and attitudes of the cameras 101 through the three-dimensional reconfiguration. The camera information calculation unit 114 may obtain the sensor information from the accumulation unit 112 and calculate the positions and attitudes of the cameras 101 using the sensor information, or may calculate the positions and attitudes of the cameras 101 using both the images and the sensor information. The calculated positions and attitudes of the cameras 101 are stored in the accumulation unit 112.

The initial camera selection unit 115 selects cameras 101 capturing images to be provided for a user 106 from an enormous number of cameras 101 capturing images of a subject. The initial camera selection unit 115 uses the positions and attitudes of the cameras 101 calculated by the camera information calculation unit 114 for the selection.

The camera switching determination unit 116 checks whether each camera 101 capturing a displayed image is capturing an image of an image capture target space or the subject, and if not, the camera switching determination unit 116 determines that the camera 101 is to be switched.

If the camera switching determination unit 116 determines that a camera 101 is to be switched, the new camera selection unit 117 selects a new camera 101. The new camera selection unit 117 uses the positions and attitudes of the cameras 101 calculated by the camera information calculation unit 114 for the selection. If there is no appropriate camera, the new camera selection unit 117 decreases the number of cameras 101 selected.

The reset determination unit 118 performs the initial camera selection again if the user 106 issues a reset instruction or the number of cameras selected becomes zero or equal to or smaller than a threshold.

Figure 3:
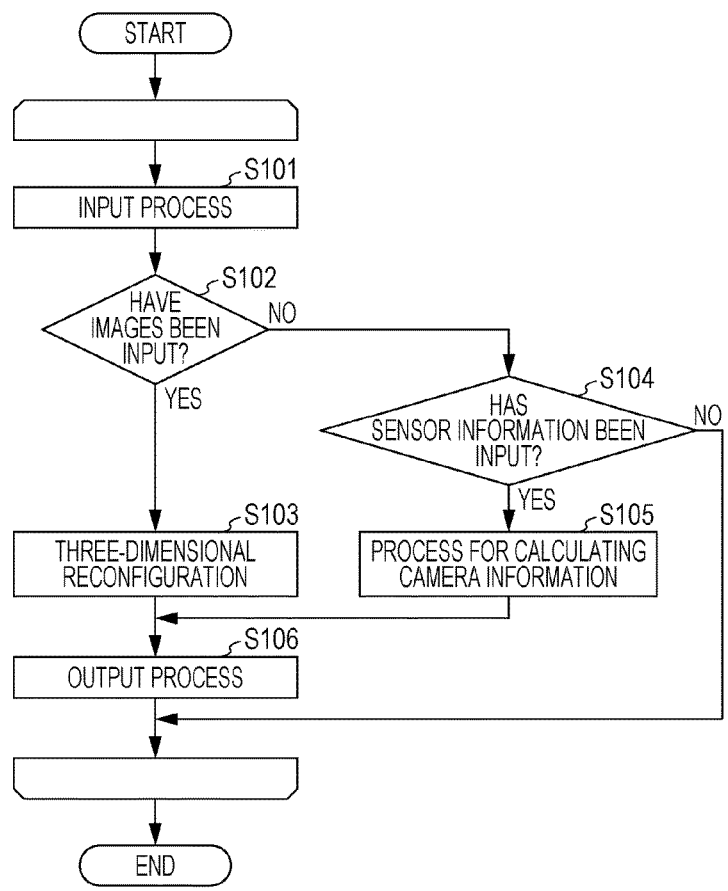
FIG. 3 is a flowchart illustrating a process for calculating camera information according to the embodiment.

The operation of the server 103 will be described hereinafter. First, a process performed by the camera information calculation unit 114 will be described. FIG. 3 is a flowchart illustrating a process for calculating camera information performed by the camera information calculation unit 114.

First, as an input process, the camera information calculation unit 114 obtains the images captured by the cameras 101, the sensor information, or both from the accumulation unit 112 (S101). The information to be obtained is specified by the control unit 113. Alternatively, the camera information calculation unit 114 may divide the images into frames and create image sets, each consisting of frames at the same point of time, in order to perform the three-dimensional reconfiguration.

If the information obtained in the input process is the images (YES in S102), the camera information calculation unit 114 performs the three-dimensional reconfiguration (S103). More specifically, the camera information calculation unit 114 calculates the positions and attitudes of the cameras 101 by performing the three-dimensional reconfiguration of the cameras 101 using the images. In the three-dimensional reconfiguration, translation vectors and rotation matrices of the cameras 101 in a three-dimensional coordinate space defined by three axes of x, y, and z under constraints of epipolar geometry. A specific example of the three-dimensional reconfiguration based on the epipolar geometry will be described in detail later with reference to FIG. 4. The translation vectors T and the rotation matrices R are represented by the following expressions (1) and (2). The translation vectors T indicate the positions of the cameras 101 in the three-dimensional space, and the rotation matrices R indicate inclinations of the cameras 101 from the axes of the three-dimensional space, that is, the attitudes of the cameras 101. In the expressions, α, β, and γ denote rotation angles of the cameras 101 along the x, y, and z axes, respectively.

$$T = [x, y, z] \quad (1)$$

$$R = \begin{bmatrix} \cos\alpha\cos\beta\cos\gamma - \sin\alpha\sin\gamma & -\cos\alpha\cos\beta\sin\gamma - \sin\alpha\cos\gamma & \cos\alpha\sin\beta \\ \sin\alpha\cos\beta\cos\gamma + \cos\alpha\sin\gamma & -\sin\alpha\cos\beta\sin\gamma - \cos\alpha\cos\gamma & \sin\alpha\sin\beta \\ -\sin\beta\cos\gamma & \sin\beta\sin\gamma & \cos\beta \end{bmatrix} \quad (2)$$

If the information obtained in the input process is the sensor information (NO in S102 and YES in S104), the camera information calculation unit 114 calculates the positions and attitudes of the cameras 101 using the sensor information output from Wi-Fi, the GPS, the gyro sensors, or the like (S105). The camera information calculation unit 114, for example, sets the three-dimensional coordinate space and calculates coordinates of the positions of the cameras 101 in the three-dimensional coordinate space and the inclinations of the cameras 101 from the axes of the three-dimensional coordinate space, that is, the attitudes of the cameras 101.

Next, the camera information calculation unit 114 stores the positions and attitudes of the cameras 101 calculated in step S103 or S105 in the accumulation unit 112 (S106).

The processing in steps S101 to S106 is repeated at certain time intervals.

The determination as to inputting of images (S102) and the determination as to inputting of sensor information (S104) need not be performed in this order. The order may be reversed, or part or the entirety of one determination may be performed in parallel with the other determination.

A principle of the three-dimensional reconfiguration will be described hereinafter with reference to FIG. 4.

In the three-dimensional reconfiguration, for example, coordinates and attitudes of cameras in a world coordinates system are calculated under constraints of the epipolar geometry. Furthermore, three-dimensional positions of points in images captured by the cameras are calculated in the world coordinate system.

Figure 4:
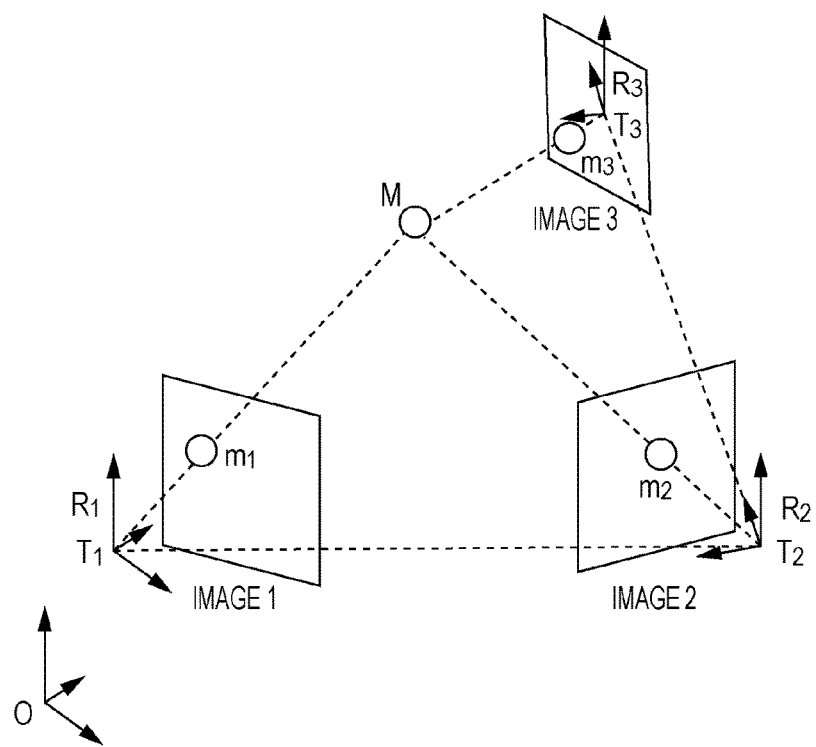
FIG. 4 is a diagram illustrating three-dimensional reconfiguration according to the embodiment.

In FIG. 4, 0 denotes an origin of the world coordinate system, and $T_1$, $T_2$, and $T_3$ indicate coordinates of Cameras 1, 2, and 3 in the world coordinate system. $R_1$, $R_2$, and $R_3$ indicate inclinations of camera coordinate systems of Cameras 1, 2, and 3 relative to the world coordinate system, and M denotes a point on a subject. In addition, $m_1$, $m_2$, and $m_3$ indicate positions of the point M on the subject in Images 1, 2, and 3 captured by Cameras 1, 2, and 3, respectively.

In order to obtain positions and image capture angles of Cameras 1, 2, and 3, rotation matrices and translation vectors between Cameras 1, 2, and 3 in the world coordinates system need to be calculated. First, a method for calculating the rotation matrix and the translation vector between Images 1 and 2 will be described. When the point $m_1 = (u_1, v_1, 1)$ in Image 1 and the point $m_2 = (u_2, v_2, 1)$ correspond to each other, an epipolar equation $m_1^T F m_2 = 0$ holds for the points $m_1$ and $m_2$. Here, F will be referred to as a "fundamental matrix (F matrix)".

On the basis of expression (3), in which an internal parameter K of Cameras 1, 2, and 3 is used, the points $m_1$ and $m_2$ can be obtained as expressions (4) and (5), which represent points in the camera coordinate systems. As a result, the epipolar equation can be converted into expression (6).

$$\tilde{m} = K^{-1} m \quad (3)$$

$$\tilde{m}_1 = (x_1, y_1, z_1) \quad (4)$$

$$\tilde{m}_2 = (x_2, y_2, z_2) \quad (5)$$

$$\tilde{m}_1^T E \tilde{m}_2 = 0 \quad (6)$$

Here, E will be referred to as an "essential matrix (E matrix)". Each element of the E matrix can be calculated using a plurality of corresponding points. Alternatively, after calculating each element of the F matrix using a plurality of corresponding points, namely, for example, the points $m_1$ and $m_2$ in the images, the E matrix may be obtained using an expression $E = K^{-1} F K$. By decomposing the E matrix, a rotation matrix and a translation vector from Image 1 to Image 2 in the world coordinate system can be obtained.

If a position of Camera 1 in the world coordinate system and inclinations of Camera 1 relative to the axes of the world coordinate system are known, positions and attitudes of Cameras 1 and 2 in the world coordinate system can be obtained using the above relationship. The position and attitude of Camera 1 in the world coordinate system may be calculated from sensor information other than an image, or may be measured in advance. Alternatively, the camera coordinate system of Camera 1 may be determined as a world coordinate system, and positions and attitudes of the other cameras may be calculated.

The three-dimensional point M in the world coordinate system can be obtained on the basis of a triangle obtained using the rotation matrix and the translation vector between Images 1 and 2.

In the present embodiment, the above geometrical relationship is applied to three or more images. In an example in which Image 3 is added to Images 1 and 2, more specifically, E matrices are calculated between Images 2 and 3 and between Images 1 and 3, and relative rotation matrices and translation vectors are obtained for these cameras. By integrating these pieces of information together, the rotation matrix and translation vector of Camera 3, which has captured Image 3, in the world coordinate system can be calculated. Alternatively, the rotation matrix and translation vector of Image 3 may be calculated in relation to Image 1 and to Image 2 on the basis of corresponding points. More specifically, corresponding points are obtained between Images 1 and 3 and between Images 2 and 3. If a point $m_3$ in Image 3 corresponding to the point $m_1$ in Image 1 and the point $m_2$ in Image 2 is obtained, a relationship between the point $m_3$ in Image 3 and coordinates in the three-dimensional space can be obtained since the three-dimensional coordinates of the corresponding point M are known. At this time, the following expression (7) holds true.

$$\tilde{m} = PM \quad (7)$$

Here, P will be referred to as a "perspective matrix (P matrix)". Because P=KE, where P denotes the P matrix, E denotes the E matrix, and E denotes the internal parameter, the E matrix of Image 3 can be obtained. The rotation matrix and the translation vector can thus be obtained.

Figure 5:
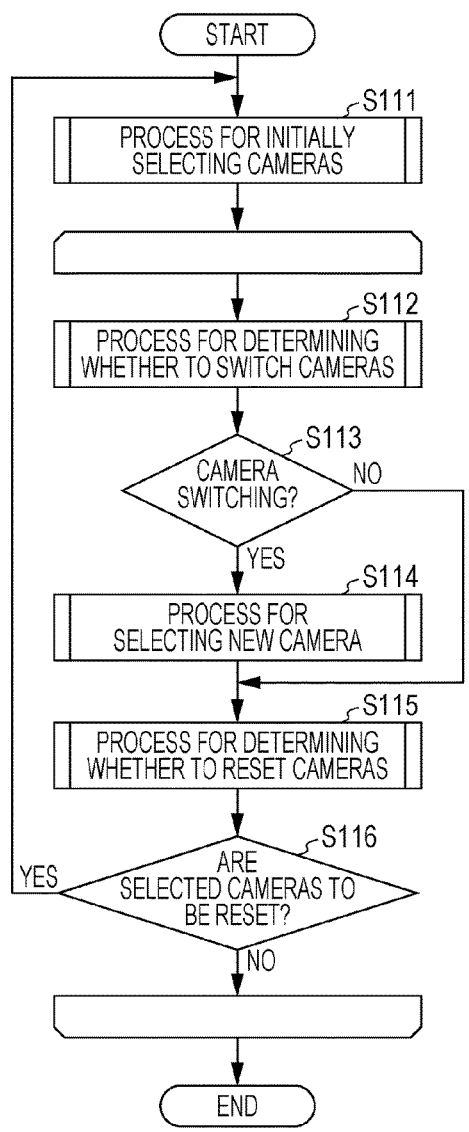
FIG. 5 is a flowchart illustrating a process for selecting images according to the embodiment.

A process for selecting images performed by the server 103 will be described hereinafter. FIG. 5 is a flowchart illustrating the process for selecting images performed by the server 103.

First, the initial camera selection unit 115 performs a process for initially selecting cameras (S111). More specifically, the initial camera selection unit 115 selects an arbitrary number of cameras provided for the user 106 from an enormous number of cameras 101 capturing images of a subject. The initial camera selection unit 115 uses the positions and attitudes of the cameras 101 calculated by the camera information calculation unit 114 for the selection.

Next, the camera switching determination unit 116 performs a process for determining whether to switch cameras (S112). More specifically, the camera switching determination unit 116 checks whether each camera 101 capturing a displayed image is capturing an image of an image capture target space or a subject, and if not, determines that the camera 101 is to be switched.

If the camera switching determination unit 116 determines that the camera 101 is to be switched (YES in S113), the new camera selection unit 117 performs a process for selecting a new camera (S114). More specifically, the camera switching determination unit 116 uses the positions and attitudes of the cameras 101 calculated by the camera information calculation unit 114 for the selection.

If there is no appropriate camera, the new camera selection unit 117 may decrease the number of cameras 101 selected. If there are a plurality of appropriate cameras for the camera 101 to be switched, the new camera selection unit 117 may increase the number of cameras 101 selected.

Next, the reset determination unit 118 performs a process for determining whether to reset cameras (S115). More specifically, if the user 106 has issued a reset instruction, or if the number of cameras 101 selected is zero or equal to or smaller than a threshold, the reset determination unit 118 determines that all the currently selected cameras 101 are to be reset.

If the reset determination unit 118 determines that all the currently selected cameras 101 are to be reset (YES in S116), the initial camera selection is newly performed (S111). At this time, the initial camera selection unit 115 may increase or decrease the number of cameras 101 selected in the initial camera selection.

The processing in steps S112 to S116 is repeated at certain time intervals.

Figure 6:
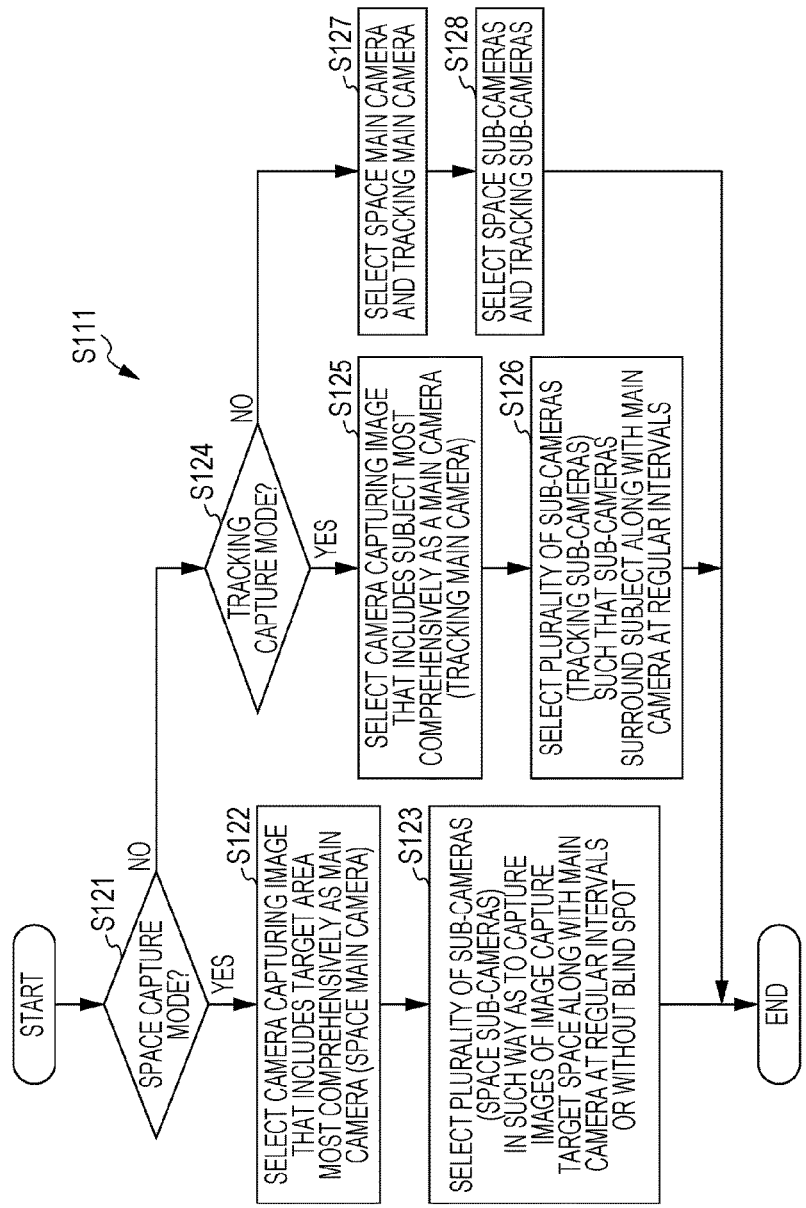
FIG. 6 is a flowchart illustrating a process for initially selecting cameras according to the embodiment.

The process for initially selecting cameras (S111 in FIG. 5) performed by the initial camera selection unit 115 will be described hereinafter. FIG. 6 is a flowchart illustrating the process for initially selecting cameras (S111).

In the present embodiment, three image capture modes, namely a space capture mode, a tracking capture mode, and a hybrid capture mode, are used. Not all the three modes, however, need to be used, and one or two image capture modes may be used, instead.

The control unit 113 controls selection of an image capture mode. More specifically, the control unit 113 selects the image capture mode on the basis of an instruction from the user 106, occurrence of an event, automatic detection of a tracking target, or the number of cameras 101 selected.

The space capture mode is a mode in which cameras 101 are selected in order to capture images of a target area, which is an area in a specified actual space. The tracking capture mode is a mode in which cameras 101 are selected in order to track a subject, which is a moving object such as a person or an object in a specified actual space and capture images of the subject. The hybrid capture mode is a combination of the space capture mode and the tracking capture mode.

If the image capture mode is the space capture mode (YES in S121), the initial camera selection unit 115 selects a camera 101 capturing an image that most comprehensively includes the target area, which is a three-dimensional area corresponding to an area in an image specified by the user 106 or a three-dimensional area determined to be important as a result of a scene analysis, as a main camera (S122). The selected camera 101 will also be referred to as a "space main camera".

If the three-dimensional reconfiguration has been performed, the initial camera selection unit 115 uses three-dimensional models to associate an area in an image and three-dimensional positions with each other. In the scene analysis, the initial camera selection unit 115 determines a center of an image capture target space or a path to the image capture target space to be important.

Next, the initial camera selection unit 115 selects a plurality of sub-cameras in such a way as to capture images of the image capture target space along with the main camera at regular intervals or without a blind spot (S123). These cameras 101 will also be referred to as "space sub-cameras".

On the other hand, if the image capture mode is the tracking capture mode (YES in S124), the initial camera selection unit 115 selects a camera 101 capturing an image that most comprehensively includes the subject, which is a subject specified by the user 106 or a subject determined to be important as a result of the scene analysis, as a main camera (S125). This camera 101 will also be referred to as a "tracking main camera". If there are a plurality of subjects, the initial camera selection unit 115 selects a main camera for each subject.

In the scene analysis, the initial camera selection unit 115 determines a person whose action is abnormal or a person who is the center of attention in a game to be important.

Alternatively, the initial camera selection unit 115 may select a camera 101 capturing an image of the subject from the front of the subject as a main camera, not a camera 101 capturing an image that includes the subject most comprehensively.

Next, the initial camera selection unit 115 selects a plurality of sub-cameras such that the sub-cameras surround the subject along with the main camera at regular intervals (S126). These cameras 101 will also be referred to as "tracking sub-cameras".

On the other hand, if the image capture mode is the hybrid image capture mode (NO in S121 and S124), the initial camera selection unit 115 selects a space main camera by the same method as in the selection of a main camera in the space capture mode and a tracking main camera by the same method as in the selection of a main camera in the target capture mode (S127).

Next, the initial camera selection unit 115 assigns the number of sub-cameras to the space capture mode and the tracking capture mode at an arbitrary ratio. The initial camera selection unit 115 then selects space sub-cameras by the same method as in the space capture mode and tracking sub-cameras by the same method as in the tracking capture mode (S128).

The determination as to the space capture mode (S121) and the determination as to the tracking capture mode (S124) need not be performed in this order. The order may be reversed, or part or the entirety of one determination may be performed in parallel with the other determination.

Figure 7:
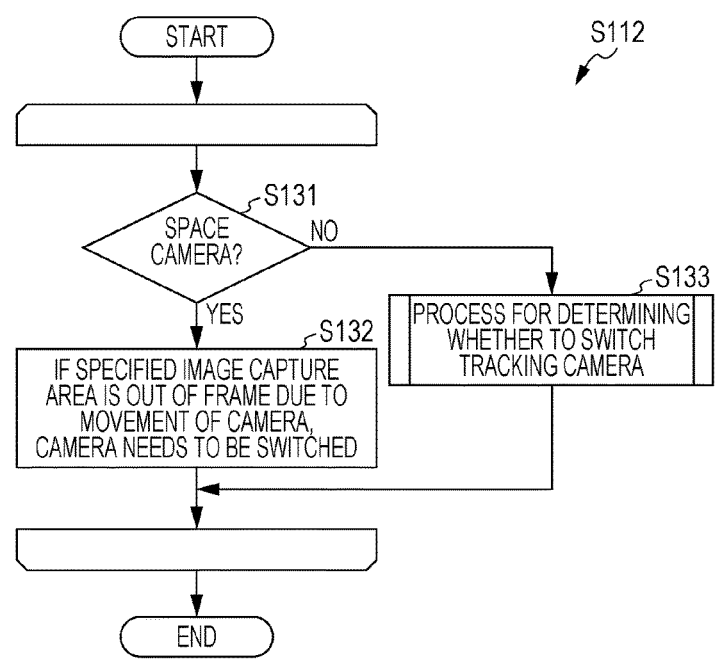
FIG. 7 is a flowchart illustrating a process for determining whether to switch cameras according to the embodiment.

The process for determining whether to switch cameras (S112 in FIG. 5) performed by the camera switching determination unit 116 will be described hereinafter. FIG. 7 is a flowchart illustrating the process for determining whether to switch cameras (S112).

The camera switching determination unit 116 performs processing in steps S131 to S133 for each of the cameras 101 selected in the process for initially selecting cameras.

First, the camera switching determination unit 116 determines whether a camera 101 to be subjected to the process (hereinafter referred to as a "target camera 101") is a space camera (a space main camera or a space sub-camera) (S131).

If the target camera 101 is a space camera (YES in S131) and a specified image capture area is out of the frame due to movement of the target camera 101, the camera switching determination unit 116 determines that the target camera 101 needs to be switched (S132). More specifically, if the amount of movement of the target camera 101 or a change in the image capture angle of the target camera 101 exceeds a threshold for the movement of the target camera 101 or the image capture angle of the target camera 101 set in advance in accordance with an angle of view of the target camera 101, the camera switching determination unit 116 determines that the image capture area is out of the frame.

On the other hand, if the target camera 101 is a tracking camera (a tracking main camera or a tracking sub-camera) (NO in S131), the camera switching determination unit 116 performs a process for determining whether to switch a tracking camera (S113). If the three-dimensional reconfiguration has been performed in a process for obtaining camera information, for example, the camera switching determination unit 116 tracks the subject using three-dimensional models.

Figure 8:
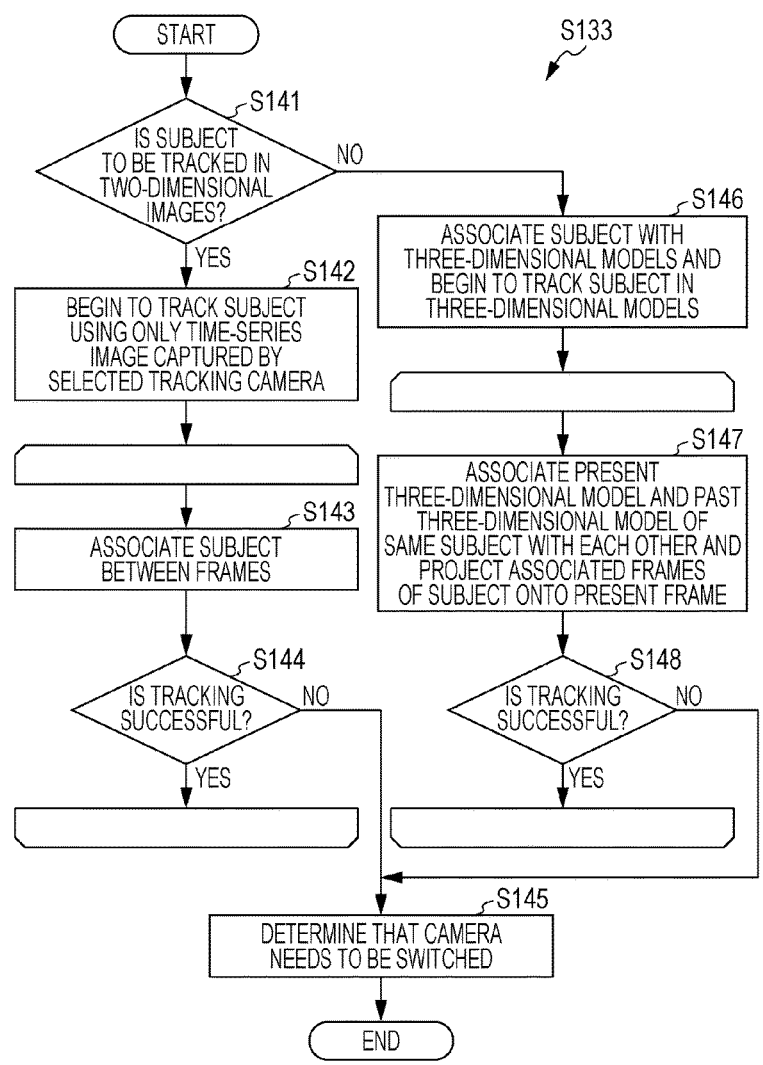
FIG. 8 is a flowchart illustrating a process for determining whether to switch a tracking camera according to the embodiment.

The process for determining whether to switch a tracking camera (S133 in FIG. 7) will be described hereinafter. FIG. 8 is a flowchart illustrating the process for determining whether to switch a tracking camera (S133).

First, the camera switching determination unit 116 determines whether to track the subject in two-dimensional images or three-dimensional models (S141). More specifically, if the three-dimensional reconfiguration has not been performed, the camera switching determination unit 116 determines that the camera switching determination unit 116 tracks the subject in two-dimensional images. If the three-dimensional reconfiguration has been performed, the camera switching determination unit 116 determines whether to track the subject in two-dimensional images or three-dimensional models on the basis of an allowable load of the server 103, a required tracking accuracy, or an instruction from the user 106.

The camera switching determination unit 116 need not selectively perform the tracking in two-dimensional images and the tracking in three-dimensional models but may perform either of the two.

If the camera switching determination unit 116 tracks the subject in two-dimensional images (YES in S141), the camera switching determination unit 116 begins to track the subject, which has been specified as a result of a scene analysis or by the user 106, using a time-series image captured by a selected tracking camera (S142).

The camera switching determination unit 116 associates the same subject between a present frame and a past frame at an image capture frame rate (S143).

If the tracking is successful (YES in S144), that is, if the association of the subject is successful, the camera switching determination unit 116 performs processing in step S143 and later for a next frame. On the other hand, if the tracking fails (NO in S144), that is, if the association of the subject fails, the camera switching determination unit 116 determines that the selected camera can no longer track the subject and needs to be switched (S145).

On the other hand, if the camera switching determination unit 116 tracks the subject in three-dimensional models (NO in S141), the camera switching determination unit 116 associates the subject with the three-dimensional models and begins to track the subject in the three-dimensional models (S146).

The camera switching determination unit 116 associates a present three-dimensional model and a past three-dimensional model of the same subject with each other at the image capture frame rate. The camera switching determination unit 116 then projects the associated frames of the subject onto a present frame of a selected tracking camera (S147).

If the tracking is successful, that is, if the three-dimensional models have been associated between frames and the subject is included in the present frame obtained as a result of the projection (YES in S148), the camera switching determination unit 116 performs the processing in step S147 and later for a next frame. On the other hand, if the tracking fails (NO in S148), that is, if the association of the three-dimensional models between frames fails, or if the present frame obtained as a result of the projection does not include subject, the camera switching determination unit 116 determines that the selected camera can no longer track the subject and needs to be switched (S145).

The process for determining whether to switch a tracking camera and a process for selecting a new tracking camera can be performed when the camera switching determination unit 116 tracks the subject only in two-dimensional images, when the camera switching determination unit 116 tracks the subject only in three-dimensional models, and when the camera switching determination unit 116 tracks the subject using both two-dimensional images and three-dimensional models. Details of these cases will be described later with reference to FIGS. 10 to 12.

Figure 9:
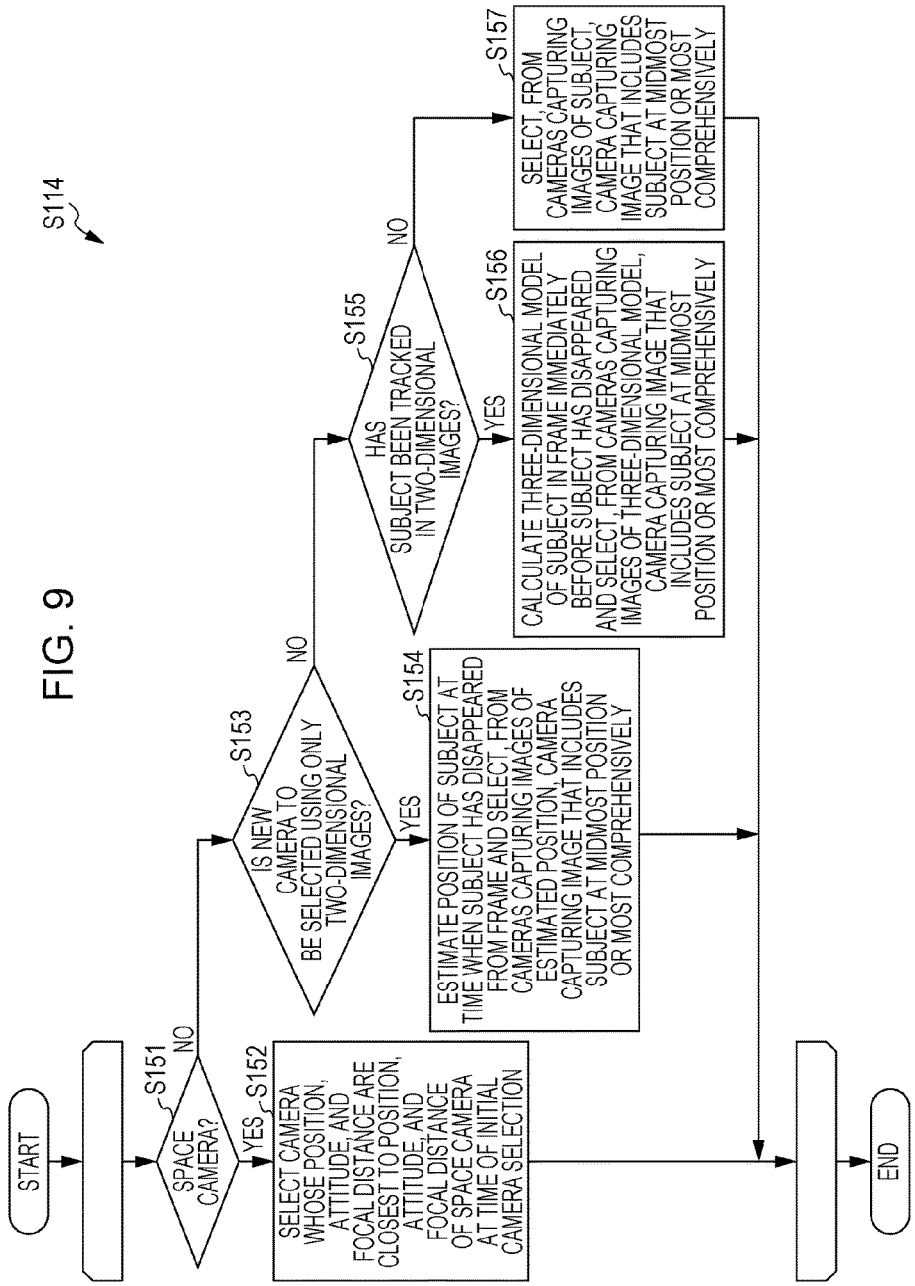
FIG. 9 is a flowchart illustrating a process for selecting a new camera according to the embodiment.

The process for selecting a new camera (S114 in FIG. 5) will be described hereinafter. FIG. 9 is a flowchart illustrating the process for selecting a new camera (S114).

Processing in steps S151 to S157 illustrated in FIG. 9 is performed for each camera 101 determined to require switching.

If a target camera 101 is a space camera (YES in S151), the new camera selection unit 117 selects, from a plurality of candidate cameras located within an arbitrarily set range, a camera 101 whose position, attitude, and focal distance are closest to a position, an attitude, and a focal distance of the space camera at a time of the initial camera selection as a new space camera (S152).

More specifically, the following evaluation expression (8) is used.

$$\text{score} = w1*(pos(cA) - pos(cB))^{\wedge}2 + \\ w2*(dir(cA) - dir(cB))^{\wedge}2 + w3*(for(cA) - for(cB))^{\wedge}2 \qquad (8)$$

Here, w1, w2, and w3 are weighting coefficients, pos(ck) denotes a position of a camera k, dir(ck) denotes an attitude of the camera k, for(ck) denotes a focal distance of the camera k, cA denotes the space camera before the switching, and cB indicates a candidate camera.

If the evaluation expression is used, the new camera selection unit 117 selects one of the plurality of candidate cameras whose score is smallest as a new space camera.

On the other hand, if the target camera 101 is a tracking camera (NO in S151), the new camera selection unit 117 determines whether to select a new camera using only two-dimensional images or three-dimensional models (S153). The determination method, for example, is the same as that used in step S141.

If a new camera is selected using only two-dimensional images (YES in S153), the new camera selection unit 117 estimates a position of a subject tracked by the camera switching determination unit 116 at a time when the subject has disappeared from a frame. The new camera selection unit 117 then selects, from cameras 101 capturing images of the estimated position, a camera 101 capturing an image that includes the subject at a midmost position or most comprehensively (S154).

On the other hand, if a new camera is selected using three-dimensional models (NO in S153), the new camera selection unit 117 determines whether the subject has been tracked in two-dimensional images or three-dimensional models in the process for determining whether to switch cameras (S155).

If the subject has been tracked in two-dimensional images (YES in S155), the new camera selection unit 117 calculates a three-dimensional model of the subject tracked by the camera switching determination unit 116 for a frame immediately before the subject has disappeared. The new camera selection unit 117 then selects, from cameras 101 capturing images of the three-dimensional model, a camera 101 capturing an image that includes the subject at a midmost position or most comprehensively (S156).

On the other hand, if the subject has been tracked in three-dimensional models (NO in S155), the new camera selection unit 117 selects, from cameras 101 capturing the subject tracked by the camera switching determination unit 116, a camera 101 capturing an image that includes the subject at a midmost position or most comprehensively (S157).

If there is no camera 101 appropriate for switching by any switching method, the new camera selection unit 117 need not perform switching and may decrease the number of cameras 101 selected. If there are a plurality of cameras 101 appropriate for switching, the new camera selection unit 117 may increase the number of cameras 101 selected.

The determination as to the image capture mode (S151), the determination as to the switching method (S153), and the determination as to the tracking method (S155) need not be performed in this order. The order may be arbitrarily determined, or part or the entirety of some or all of the determinations may be performed in parallel with each other.

An operation for tracking a subject using only two-dimensional images in the process for determining whether to switch a tracking camera and the process for selecting a new camera will be described in detail hereinafter. FIGS. 10 and 11 are diagrams illustrating the operation.

FIG. 10 is a diagram illustrating frames 201A, 201B, and 201C captured by a tracking camera at times t, t+1, and t+2, respectively.

First, at the time t+1, the camera switching determination unit 116 tracks a subject 202 by associating the frame 201B at the time t+1 and the frame 201A at the time t with each other. Frames to be associated with each other need not be consecutive frames. Frames separated from each other by one or more frames may be associated with each other, or three or more frames including a future frame, namely, for example, the frame 201C at the time t+2, may be associated with one another.

More specifically, the camera switching determination unit 116 associates frames through template matching of a rectangular area surrounding the subject 202. Alternatively, the camera switching determination unit 116 may integrate results of template matching for sub-areas obtained by dividing the rectangular area and associate frames using a result of the integration, or may associate frames by associating a plurality of feature points or local feature values on the subject 202 with one another.

Alternatively, the camera switching determination unit 116 may track the subject 202 through online learning in which a subject area is determined as a correct area and nearby areas are determined as incorrect areas.

Alternatively, the camera switching determination unit 116 need not track the subject 202 using only one selected camera 101. The camera switching determination unit 116 may track the subject 202 using a plurality of cameras 101 including the selected camera 101, integrate results of the tracking performed by the plurality of cameras 101, and track the subject 202 using a result of the integration. The camera switching determination unit 116 detects the same subject 202 in images captured by the cameras 101, for example, by performing particular object identification using a database obtained in advance by learning images of the subject 202 captured from a plurality of points of view.

At the time t+2, the subject 202 gets out of the frame of the tracking camera. FIG. 11 is a diagram illustrating an actual space at the time t+2. A camera 101A is a selected tracking camera and is capturing an image of an area 203A.

Since the subject 202 has got out of the frame at the time t+2, the camera switching determination unit 116 determines that the camera 101A needs to be switched.

The new camera selection unit 117 calculates the area 203A whose image is being captured by the camera 101A on the basis of a position, an attitude, and a focal distance of the selected tracking camera calculated by the camera information calculation unit 114. The new camera selection unit 117 estimates that the subject 202 who has got out of the frame is located near a right end of the area 203A.

The new camera selection unit 117 then selects, from a plurality of cameras 101 capturing images of an area near the right end of the area 203A, a camera 101B, which is capturing an image that includes the subject 202 at a midmost position or most comprehensively, as a new tracking camera. In this example, the camera 101B is capturing an image of an area 203B including the subject 202.

In order to continue the tracking, the subject 202 needs to be identified in the image captured by the camera 101B. The new camera selection unit 117, for example, associates a frame of the camera 101A at the time t+1 and a frame of the camera 101B at the time t+2 with each other. The new camera selection unit 117 associates the frames with each other, for example, by the same method as for associating frames of the camera 101A to track the subject 202.

In order to correct a difference between fields of view of the cameras 101A and 101B, the new camera selection unit 117 may track the subject 202 using frames obtained as a result of a projective transformation based on camera information such as positions, attitudes, and focal distances of the cameras 101A and 101B.

The camera switching is performed not only when the subject 202 has got out of the frame but also when the subject 202 is included in a field of view of a selected tracking camera but has disappeared from the frame due to occlusion.

The new camera selection unit 117 need not necessarily switch a camera immediately after the subject 202 disappears from a frame. The new camera selection unit 117 may continue estimating the movement of the subject 202 even after the disappearance and wait until the subject 202 appears in a frame again, instead. That is, the new camera selection unit 117 may perform camera switching if the subject 202 is not included in an image captured by a selected tracking camera for a predetermined period of time (a plurality of frames).

An operation for tracking the subject 202 using only three-dimensional models in the process for determining whether to switch a tracking camera and the process for selecting a new camera will be described in detail hereinafter. FIG. 12 is a diagram illustrating the operation.

First, if the subject 202 to be tracked is specified in the image (frame 201A) at the time t, the subject 202 in the image needs to be identified in a three-dimensional model.

The camera switching determination unit 116 calculates a perspective projection matrix between the image and the three-dimensional space on the basis of a position, an attitude, and a focal distance of a selected tracking camera calculated by the camera information calculation unit 114. The camera switching determination unit 116 then identifies the subject 202 in the three-dimensional model by projecting feature points on the subject 202 in the image onto the three-dimensional space using the perspective projection matrix.

At the time t+1, the camera switching determination unit 116 tracks the subject 202 by associating a three-dimensional model at the time t+1 and the three-dimensional model at the time t with each other. The camera switching determination unit 116 need not associate three-dimensional models at consecutive times with each other. The camera switching determination unit 116 may associate three-dimensional models at two times separated from each other by one or more times (frames) with each other, or may associate three-dimensional models at three or more times including a future three-dimensional model, namely, for example, a three-dimensional model at the time t+2, with one another.

More specifically, the camera switching determination unit 116 associates three-dimensional models with each other through matching of a voxel surrounding the subject 202. Alternatively, the camera switching determination unit 116 may integrate results of matching of sub-voxels obtained by dividing the voxel and associate three-dimensional models with each other using a result of the integration, or may associate three-dimensional models with each other by associating a plurality of three-dimensional feature points or three-dimensional local feature values on the subject 202 with one another.

Alternatively, the camera switching determination unit 116 may track the subject 202 through online learning in which a subject area is determined as a correct area and nearby areas are determined as incorrect areas.

During the tracking, the camera switching determination unit 116 projects the subject 202 in the three-dimensional model at each time onto an image plane at each time and checks whether the subject 202 is included in the field of view of the tracking camera. More specifically, the camera switching determination unit 116 projects the subject 202 by the same method as for the association between the image and the three-dimensional model at the time t.

At the time t+2, the subject 202 gets out of the frame of the tracking camera. In order to select a new tracking camera, the new camera selection unit 117 projects the three-dimensional model of the subject 202 onto an image plane of each camera 101. The new camera selection unit 117 projects the three-dimensional model by the same method as for the association between the image and the three-dimensional model at the time t.

The new camera selection unit 117 then selects a camera 101 capturing an image that includes the subject 202 at a midmost position or most comprehensively as a new tracking camera.

As in the case described with reference to FIGS. 10 and 11 in which two-dimensional images are used, the camera switching is performed not only when the subject 202 has got out of the frame but also when the subject 202 is included in a field of view of a selected tracking camera but has disappeared from the frame due to occlusion.

The new camera selection unit 117 need not necessarily switch a camera immediately after the subject 202 disappears from a frame. The new camera selection unit 117 may continue estimating the movement of the subject 202 even after the disappearance and wait until the subject 202 appears in a frame again, instead.

An operation for tracking the subject 202 using both two-dimensional images and three-dimensional models in the process for determining whether to switch a tracking camera and the process for selecting a new camera will be described in detail hereinafter. FIG. 13 is a diagram illustrating the operation.

At the time t, the camera switching determination unit 116 tracks the subject 202 by the same method as that used when, as illustrated in FIG. 10, only two-dimensional images are used.

Since the tracking camera has lost sight of the subject 202 at the time t+2, the new camera selection unit 117 selects a new tracking camera using the frame 201B at the time t+1, which is a last time that the tracking of the subject 202 has been successful, and the three-dimensional model at the time t+1.

The camera switching determination unit 116 associates the subject 202 in the frame 201B at the time t+1 and the subject 202 in the three-dimensional model at the time t+1 with each other by the same method as that used when, as illustrated in FIG. 10, only two-dimensional images are used. The new camera selection unit 117 selects a new tracking camera on the basis of three-dimensional models by the same method described with reference to FIG. 12. The camera switching determination unit 116 continues tracking the subject 202 by the same method described with reference to FIGS. 10 and 11 using a time-series image captured by the new tracking camera.

As in the cases described with reference to FIGS. 10 to 12, the camera switching is performed not only when the subject 202 has got out of the frame but also when the subject 202 is included in a field of view of a selected tracking camera but has disappeared from the frame due to occlusion.

The new camera selection unit 117 need not necessarily switch a camera immediately after the subject 202 disappears from a frame. The new camera selection unit 117 may continue estimating the movement of the subject 202 even after the disappearance and wait until the subject 202 appears in a frame again, instead.

In the cases described with reference to FIGS. 12 and 13, the camera information calculation unit 114 may calculate only the positions, attitudes, and focal distances of the cameras 101 and the camera switching determination unit 116 may reconfigure three-dimensional models of the subject 202. In this case, the camera switching determination unit 116 may use images captured by all the cameras 101, only images including the subject 202, or only images of a selected tracking camera and nearby cameras 101.

In the tracking of the subject 202 in the process for determining whether to switch a tracking camera described with reference to FIGS. 8 and 10 to 13, the camera switching determination unit 116 may select cameras 101 suitable to track the subject 202 separately from a selected camera used for displaying an image for the user 106 and track the subject 202 using these cameras 101.

Figure 14:
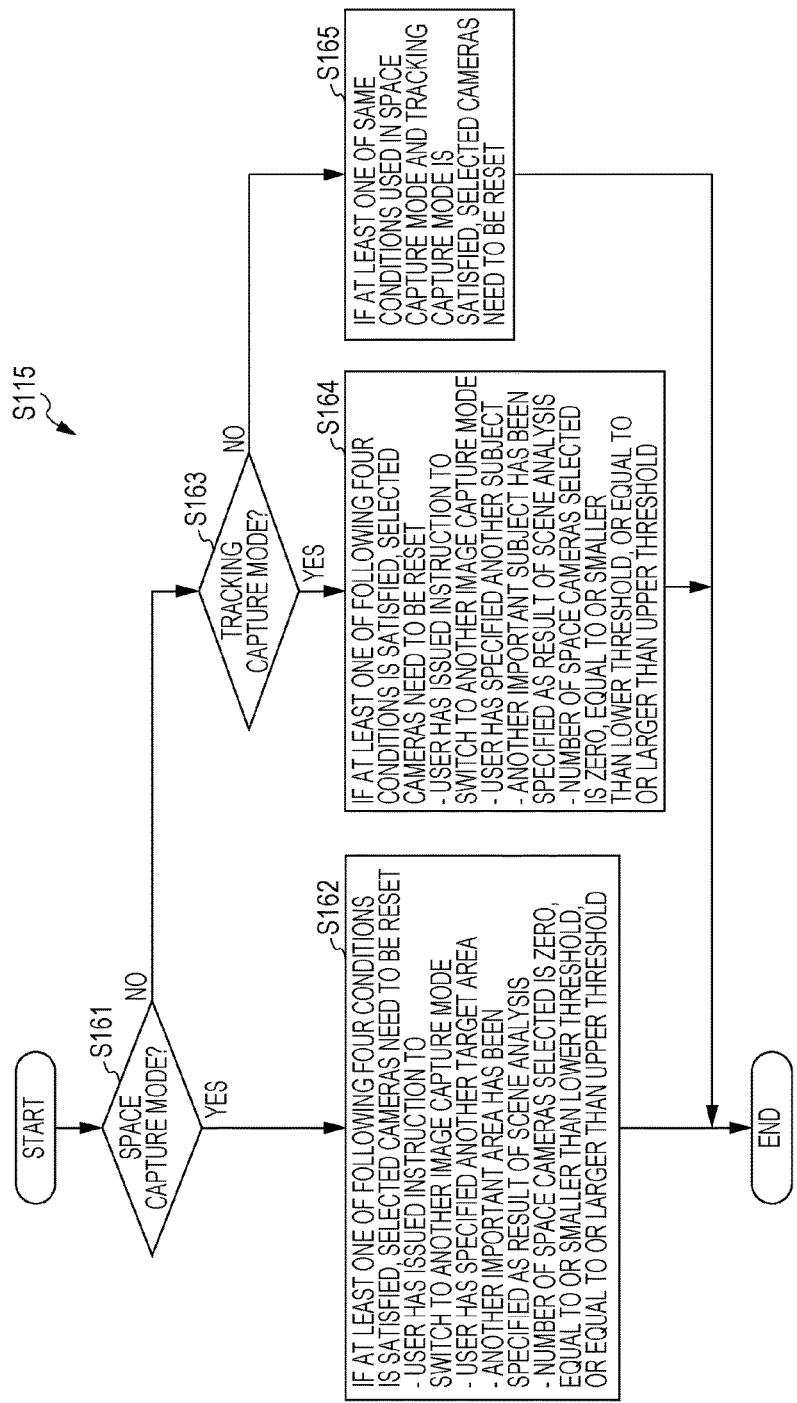
FIG. 14 is a flowchart illustrating a process for determining whether to reset cameras according to the embodiment.

The process for determining whether to reset cameras (S115 in FIG. 5) will be described hereinafter. FIG. 14 is a flowchart illustrating the process for determining whether to reset cameras (S115).

If the image capture mode is the space capture mode (YES in S161) and at least one of the following four conditions is satisfied, the reset determination unit 118 determines that selected cameras 101 need to be reset (S162). (1) The user 106 has issued an instruction to switch to another image capture mode. (2) The user 106 has specified another target area. (3) Another important area (target area) has been specified as a result of a scene analysis. (4) The number of space cameras selected is zero, equal to or smaller than a lower threshold, or equal to or larger than an upper threshold.

If the image capture mode is the tracking capture mode (YES in S163) and at least one of the following four conditions is satisfied, the reset determination unit 118 determines that selected cameras 101 need to be reset (S164). (1) The user 106 has issued an instruction to switch to another image capture mode. (2) The user 106 has specified another subject. (3) Another important subject has been specified as a result of a scene analysis. (4) The number of tracking cameras selected is zero, equal to or smaller than a lower threshold, or equal to or larger than an upper threshold.

If the image capture mode is the hybrid capture mode (NO in S161 and S163) and at least one of the same conditions used in the space capture mode and the tracking capture mode is satisfied, the reset determination unit 118 determines that selected cameras 101 need to be reset (S165).

Figure 15:
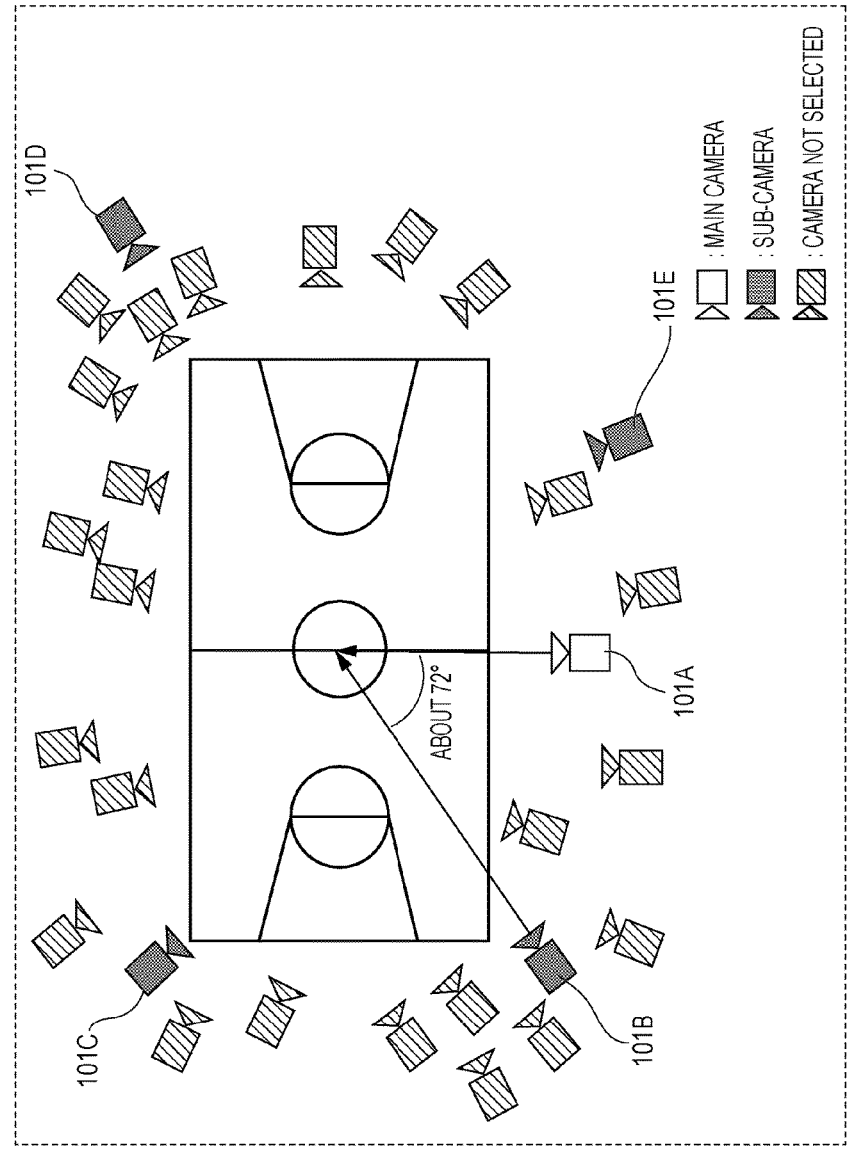
FIG. 15 is a diagram illustrating an example of selection of cameras in an event space in a space capture mode according to the embodiment.
Figure 16:
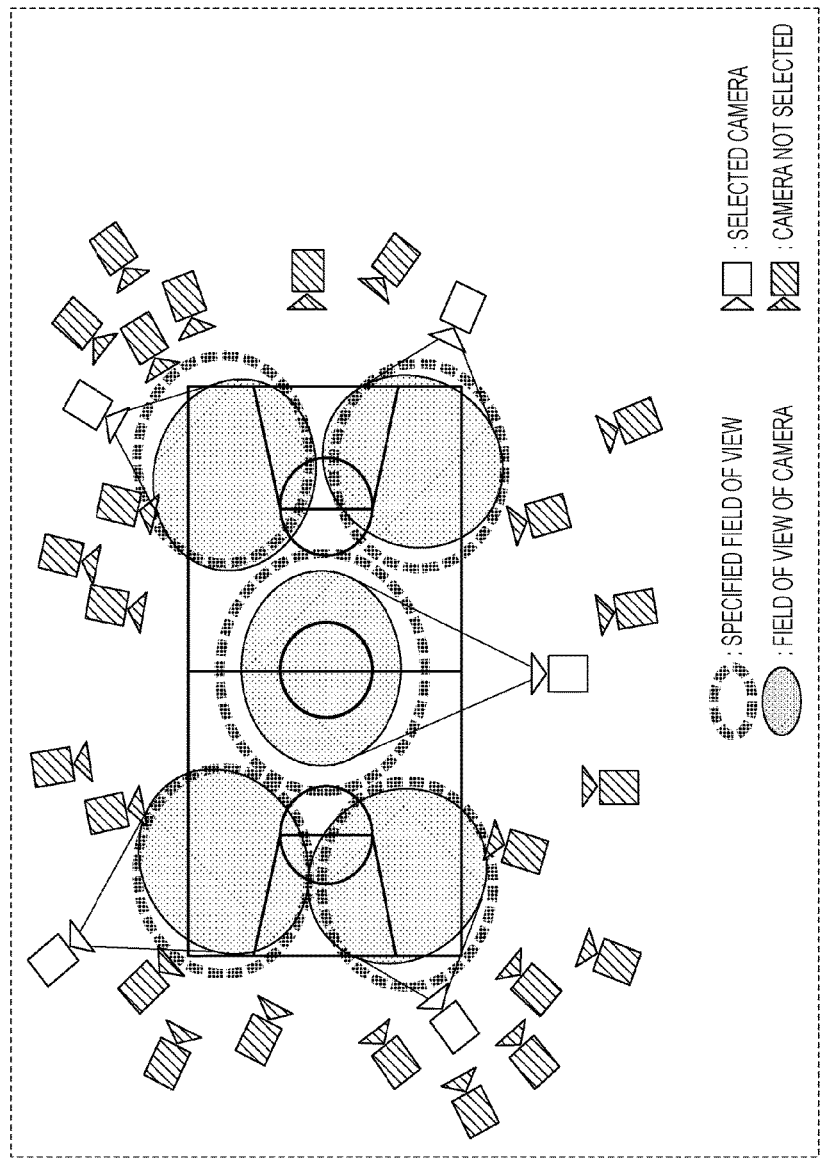
FIG. 16 is a diagram illustrating another example of the selection of cameras in the event space in the space capture mode according to the embodiment.

A specific example of the selection of cameras 101 in an event space (e.g., a stadium or a concert hall) in the space capture mode will be described hereinafter. FIGS. 15 and 16 are diagrams illustrating the specific example of the selection of cameras 101 in an event space in the space capture mode.

First, an example will be described with reference to FIG. 15 in which a plurality of cameras 101 are selected at regular intervals.

The initial camera selection unit 115 selects, as a main camera, a camera 101A capturing an image that most comprehensively includes a target area, which is a three-dimensional area corresponding to an area in an image specified by the user 106 or a three-dimensional image determined to be important as a result of a scene analysis. The initial camera selection unit 115 also selects sub-cameras at regular image capture angle intervals on the basis of a position of the main camera.

The server 103 may output information indicating whether each selected camera is a main camera or a sub-camera, as well as a result of the selection of cameras 101. The information is used by a display application.

As illustrated in FIG. 15, an event space where a spectator stand is provided in such a way as to surround a basketball court will be taken as an example.

The initial camera selection unit 115 selects sub-cameras 101B to 101E at regular intervals on the basis of a position of the main camera 101A so that the user 106 can view a game from various angles. The main camera 101A may be a camera closest to a position specified by the user 106, a camera capturing an image that includes the position specified by the user 106 at a midmost position or most comprehensively, or a camera closest to best seats. The best seats are determined in advance.

The sub-cameras 101B to 101E are selected on the basis of the position of the main camera 101A and a position of a center of the event space.

If the initial camera selection unit 115 selects a total of five cameras including the main camera and the sub-cameras, for example, the initial camera selection unit 115 selects the sub-cameras at intervals of about 72° with a center of a center circle, which is located at the center of the event space, determined as an origin and an angle of the main camera 101A determined as 0°. An angle relative to the origin is calculated on the basis of a position and an image capture angle of each camera. The origin need not necessarily be the center of the event space, but may be a position of a hoop, an electric bulletin board, or a bench, instead.

Alternatively, the initial camera selection unit 115 may calculate intervals of cameras for every combination of five cameras capturing images of the specified position and select a combination in which five cameras are arranged at most regular intervals with the center of the center circle determined as the origin. In this case, each camera need not be classified as a main camera or a sub-camera.

Next, an example will be described with reference to FIG. 16 in which cameras 101 are selected on the basis of fields of view. As illustrated in FIG. 16, an event space where a spectator stand is provided in such a way as to surround a basketball court will be taken as an example.

The initial camera selection unit 115 selects space cameras capturing images of the basketball court, which is the event space, without a blind spot so that the user 106 can watch a game from various angles.

If the initial camera selection unit 115 selects five cameras, for example, the initial camera selection unit 115 determines fields of view of the five cameras in advance. The fields of view may be selected by the user 106, or may be selected by the initial camera selection unit 115 in such a way as to divide the basketball court into five equal parts.

The initial camera selection unit 115 selects cameras whose fields of view are closest to the predetermined fields of view as space cameras. The initial camera selection unit 115 calculates a field of view of each camera on the basis of a position, an attitude, and a focal distance of each camera.

Alternatively, the initial camera selection unit 115 may determine the fields of view without overlap so that the user 106 can watch seamlessly connected images when a selected camera is switched. If images captured by selected cameras can be combined with one other to generate a panoramic image and the image can be displayed by a display application, the initial camera selection unit 115 may determine the fields of view such that the images overlap with one another for the purpose of combining.

Figure 17:
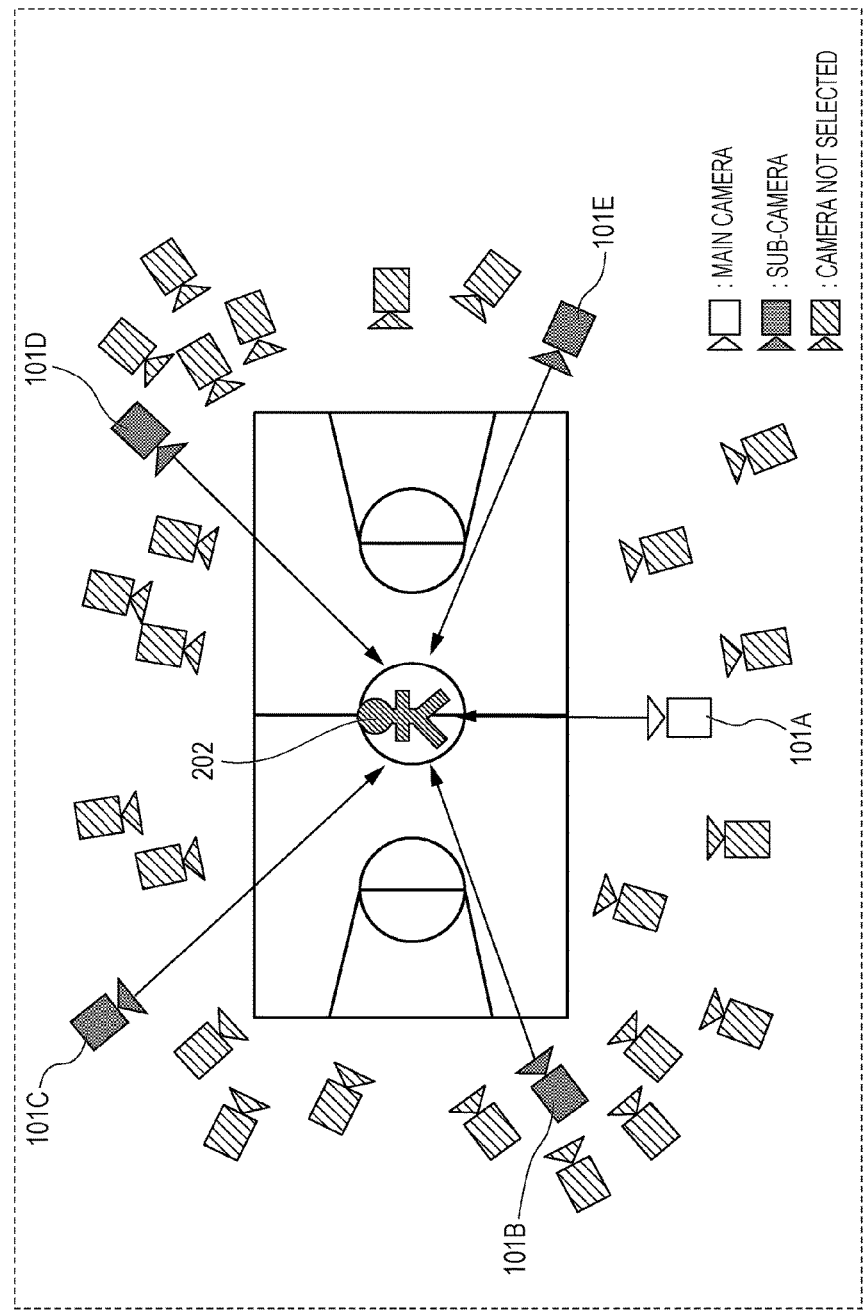
FIG. 17 is a diagram illustrating an example of selection of cameras in the event space in a tracking capture mode according to the embodiment.
Figure 18:
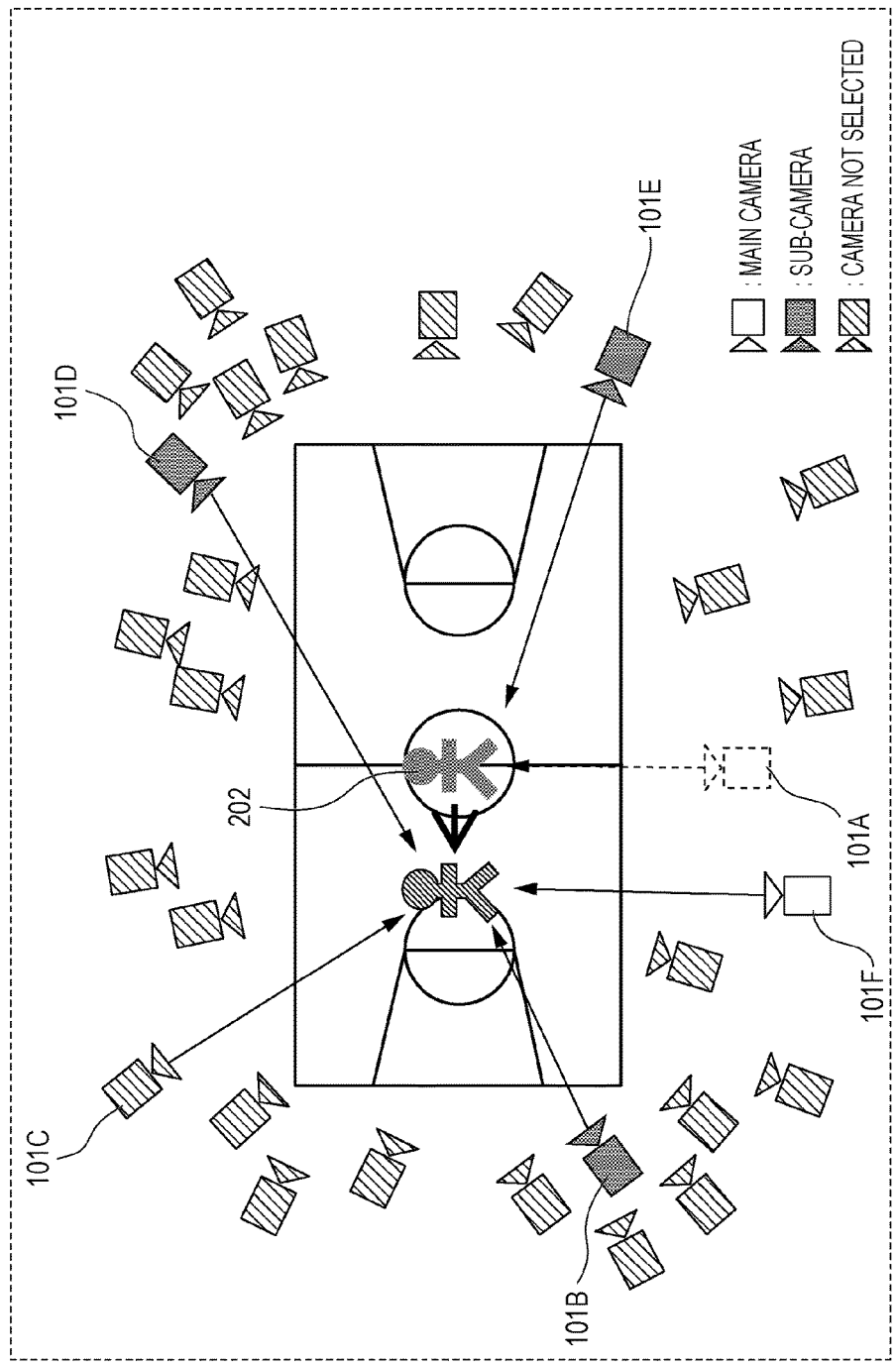
FIG. 18 is a diagram illustrating an example of selection of a new camera in the event space in the tracking capture mode according to the embodiment.
Figure 19:
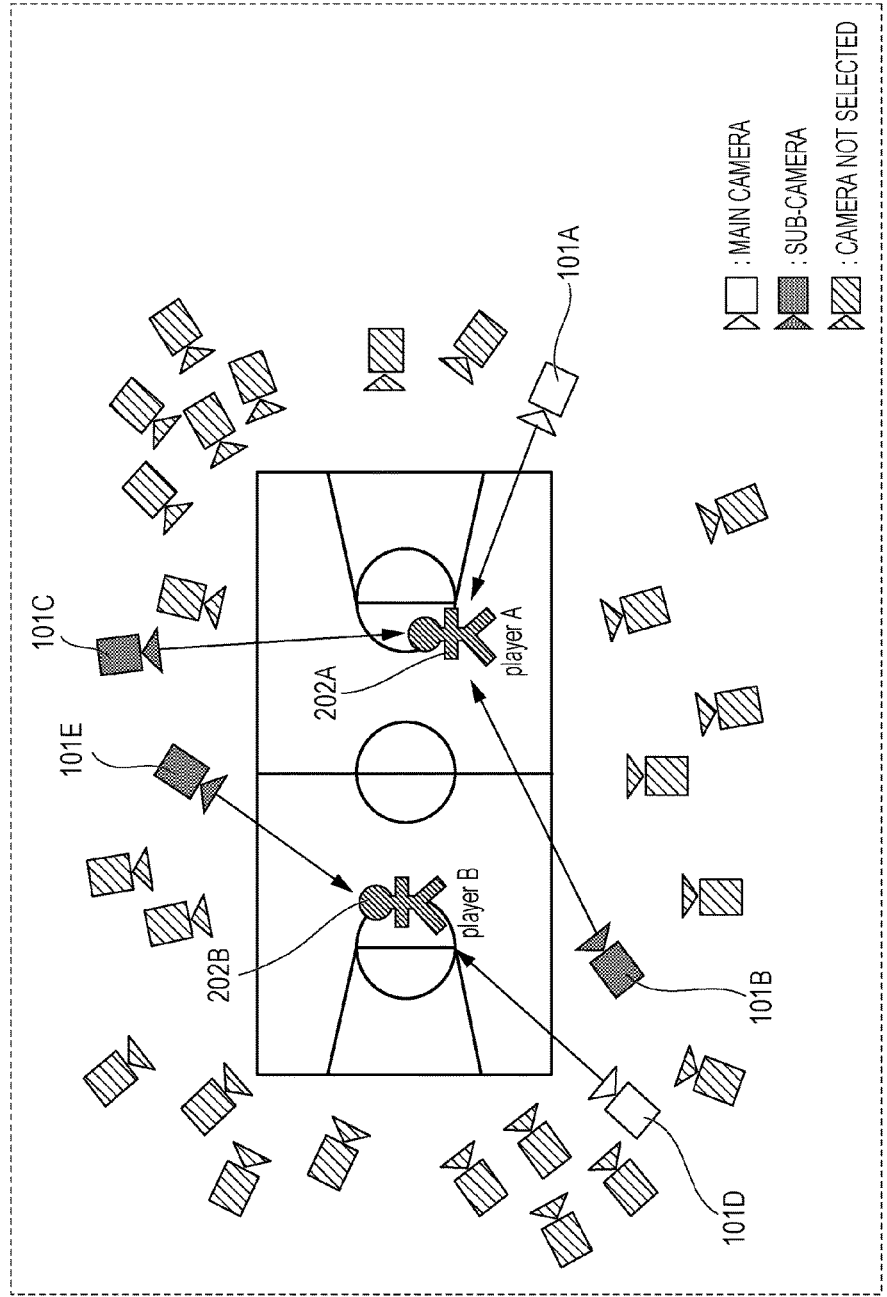
FIG. 19 is a diagram illustrating another example of the selection of cameras in the event space in the tracking capture mode according to the embodiment.

A specific example of the selection of cameras 101 in the event space in the tracking capture mode will be described hereinafter. FIGS. 17, 18, and 19 are diagrams illustrating the specific example of the selection of cameras 101 in the event space in the tracking capture mode.

FIG. 17 is a diagram illustrating a process for initially selecting cameras performed when there is only one subject. As illustrated in FIG. 17, a case will be described in which only one subject is focused upon in a basketball game.

The initial camera selection unit 115, for example, identifies a player who has a ball through specification performed by the user 106 or as a result of a scene analysis and selects the identified player, who is a player to be focused upon, as the subject 202.

The initial camera selection unit 115 selects a camera 101A capturing an image of the player from the front of the player or an image that includes the player most comprehensively as a main camera and sub-cameras 101B to 101E at regular image capture angle intervals on the basis of a position of the main camera. If the initial camera selection unit 115 selects five cameras, for example, the initial camera selection unit 115 selects the sub-cameras 101B to 101E at intervals of about 72° with a position of the player determined as an origin and an angle of the main camera 101A determined as 0°. The initial camera selection unit 115 calculates an angle relative to the origin on the basis of a position and an image capture angle of each camera. The subject 202 need not necessarily be a player, but may be a hoop or an electric bulletin board.

FIG. 18 is a diagram illustrating the process for selecting a new camera in the event space in the tracking capture mode performed when there is only one subject. As illustrated in FIG. 18, a case will be described in which only one subject is focused upon in a basketball game.

In the tracking capture mode, the new camera selection unit 117 tracks the subject 202 and, if a currently selected tracking camera can no longer capture an image of the subject 202, switches the camera. If the subject 202 is disappearing from an image captured by a certain tracking camera, for example, the new camera selection unit 117 searches for a camera capturing an image of the subject 202 at a midmost position in accordance with a result of the tracking of the subject 202 and determines the camera obtained as a result of the search as a new tracking camera.

If three-dimensional reconfiguration based on a plurality of images has been performed, the subject 202 has been reconfigured as a three-dimensional model. The new camera selection unit 117 therefore tracks the subject 202 in a three-dimensional space. The new camera selection unit 117 switches the tracking camera to a camera capturing an image that includes three-dimensional points on the subject 202 at a midmost position or most comprehensively.

If three-dimensional reconfiguration based on a plurality of images has not been performed, the new camera selection unit 117 tracks the subject 202 in two-dimensional images. During the tracking, the new camera selection unit 117 predicts a next movement of the subject 202 using a past frame and a present frame and switches the tracking camera to a camera capturing an image of a space to which the subject 202 is going.

If the subject 202 is moving as illustrated in FIG. 18, for example, the new camera selection unit 117 tracks the subject 202.

If three-dimensional models of the subject 202 have been reconfigured, the new camera selection unit 117 tracks the subject 202 in the three-dimensional space. If three-dimensional models of the subject 202 have not been reconfigured, the new camera selection unit 117 predicts the movement of the subject 202 in two-dimensional images. The new camera selection unit 117 then switches the selected camera to a camera 101F capturing an image that includes the subject 202 at a midmost position or most comprehensively.

FIG. 19 is a diagram illustrating an operation at a time when there are a plurality of subjects in the event space. As illustrated in FIG. 19, a case will be described in which a plurality of subjects 202A and 202B are focused upon in a basketball game.

The initial camera selection unit 115 selects two or more players to be focused upon as the subjects 202A and 202B as a result of specification of the subjects 202A and 202B performed by the user 106 or a scene analysis and assigns at least one camera to each subject. The initial camera selection unit 115 selects a camera capturing an image of each subject from the front of each subject or an image that includes each subject most comprehensively as a main camera. That is, there are the same number of main cameras as subjects. Next, the initial camera selection unit 115 selects sub-cameras at regular image capture angle intervals on the basis of a position of each main camera.

If five cameras are to capture images of two players, for example, the initial camera selection unit 115 assigns three cameras to Player A (subject 202A) and two cameras to Player B (subject 202B). Since a main camera has been assigned to each player, the initial camera selection unit 115 selects sub-cameras 101B and 101C for Player A at intervals of about 120° with a position of Player A determined as an origin and an angle of a main camera 101A determined as 0°. Similarly, the initial camera selection unit 115 selects a sub-camera 101E for Player B at an interval of about 180° with a position of Player B determined as an origin and an angle of a main camera 101D determined as 0°.

The initial camera selection unit 115 assigns more cameras to a player to whom priority has been given by the user 106 or a player who has the ball or who is closest to the ball identified as a result of a scene analysis. If the number of players to be focused upon exceeds the number of cameras selected, the initial camera selection unit 115 ranks the players in order of priority and assigns the selected cameras to the players in order of priority.

The camera switching determination unit 116 tracks the players by the same method described with reference to FIG. 18. The initial camera selection unit 115 may select cameras in the hybrid capture mode, which is a combination of the space capture mode and the tracking capture mode, insofar as the number of cameras selected permits.

Figure 20:
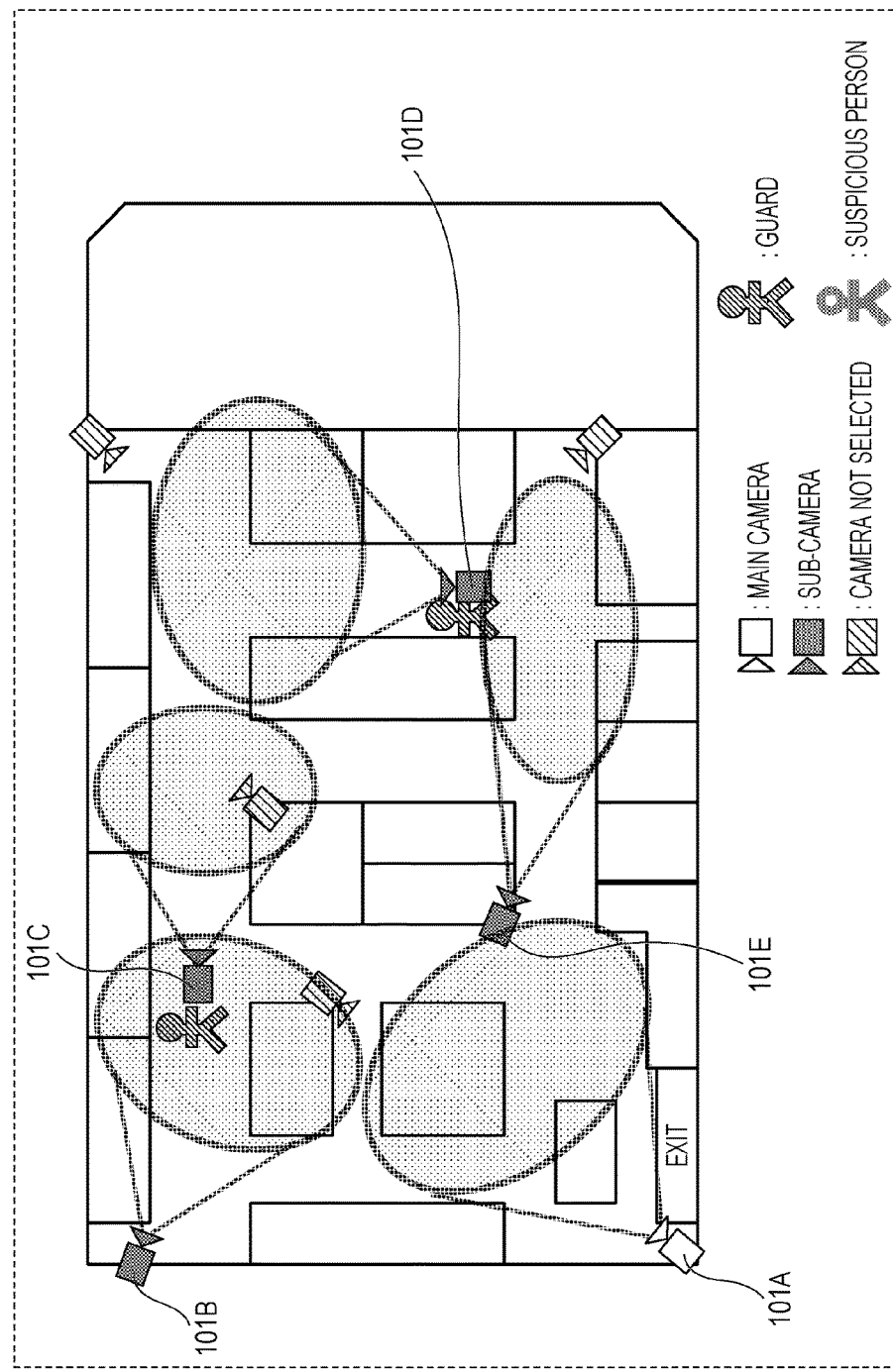
FIG. 20 is a diagram illustrating an example of selection of cameras in a security environment in the space capture mode according to the embodiment.

An example of an operation in a security environment of a shopping center will be described hereinafter with reference to FIGS. 20 and 21. FIG. 20 is a diagram illustrating selection of cameras 101 in the security environment of the shopping center in the space capture mode.

As illustrated in FIG. 20, the security environment of the shopping center in which cameras are fixed on a ceiling and pillars and mobile cameras are carried by guards will be taken as an example.

The initial camera selection unit 115 selects cameras 101 without a blind spot in order to keep the entirety of the shopping center under guard. The initial camera selection unit 115 selects a camera 101 capturing an image of a place or a person specified by the user 106 through a user interface (UI) or an image of a place determined to be important for security purposes, such as a product delivery entrance, as a main camera. The initial camera selection unit 115 then selects sub-cameras in order to monitor places where the main camera is not monitoring.

In the example illustrated in FIG. 20, for example, a camera 101A capturing an image of an exit is selected as a main camera, and sub-cameras 101B to 101E are selected in order to monitor the entirety of the shopping center.

The initial camera selection unit 115 obtains areas of the shopping center whose images can be captured by security cameras and blind spots as preliminary information. The blind spots may be monitored by the mobile cameras carried by the guards.

Figure 21:
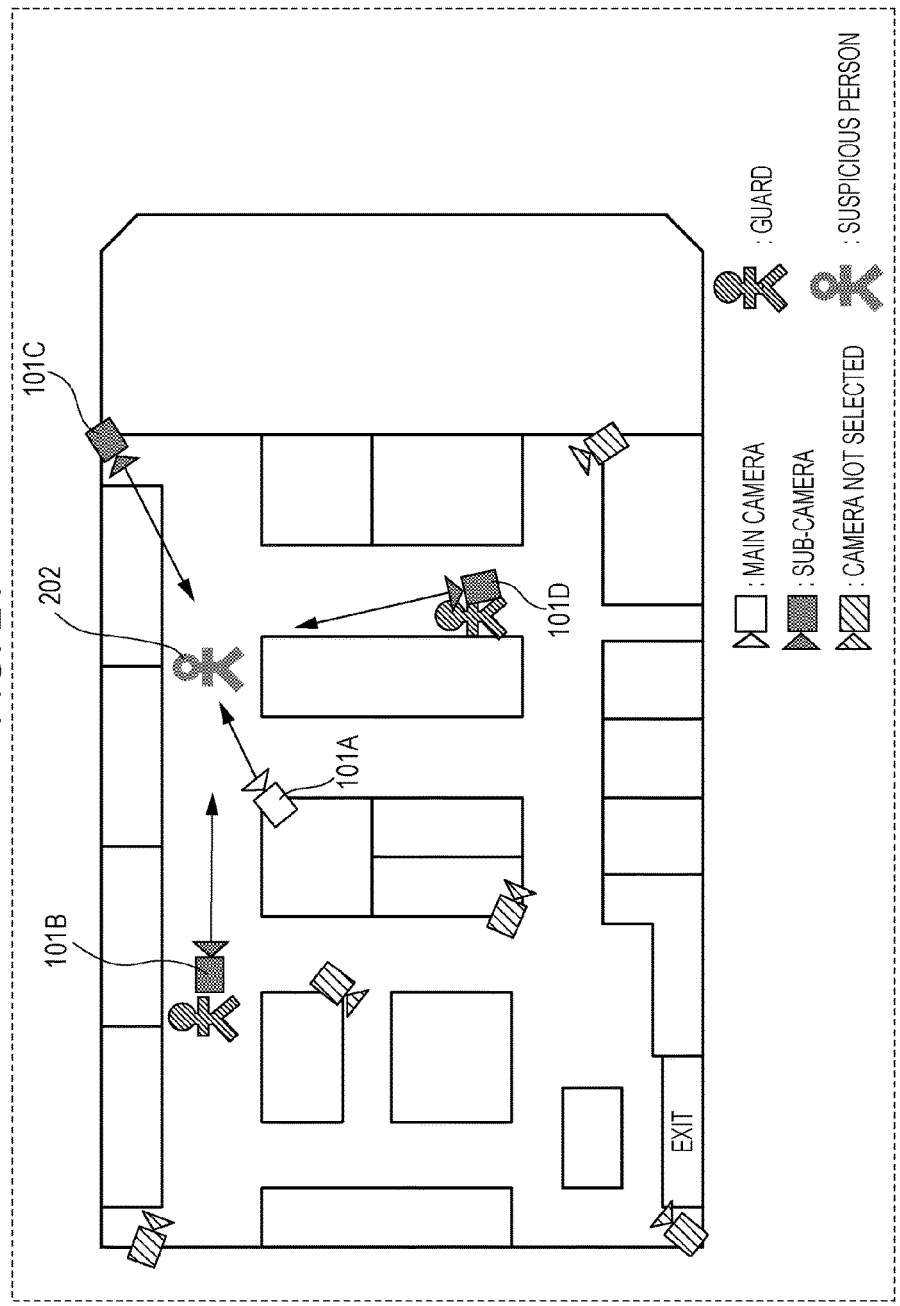
FIG. 21 is a diagram illustrating another example of the selection of cameras in the security environment in the tracking capture mode according to the embodiment.

FIG. 21 is a diagram illustrating selection of cameras 101 in the security environment of the shopping center in the tracking capture mode.

As illustrated in FIG. 21, a case will be described in which only one subject 202 is focused upon in the security environment of the shopping center.

The initial camera selection unit 115 identifies at least one person specified by the user 106 through the UI or at least one person whose action is abnormal identified as a result of a scene analysis and selects the identified person(s) as the subject(s) 202. The initial camera selection unit 115 also ranks the cameras 101 in the shopping center on the basis of distances between the subject 202 and the cameras 101, angles of the cameras 101 relative to the front of the subject 202, or areas (the number of pixels) of the subject 202 included in images captured by the cameras 101, and selects a certain number of cameras 101 in order of priority. At this time, the initial camera selection unit 115 selects a camera 101 of highest priority as a main camera.

In the example illustrated in FIG. 21, the camera 101A is selected as a main camera, and cameras 101B to 101D are selected as sub-cameras.

The subject 202 need not be a person, but may be a place where an event, such as a fire or collapse of a pile of products, has occurred, instead.

In the examples illustrated in FIGS. 15 to 21, a sound transmitted from the server 103 to the terminal apparatus 102 may be one obtained by the main camera, one obtained by a terminal closest to the main camera, one obtained by a terminal closest to a place specified by the user 106 through the UI, one obtained by a terminal closest to the subject 202, one of highest sound quality, or one obtained by combining sounds obtained by a plurality of terminals.

Figure 22:
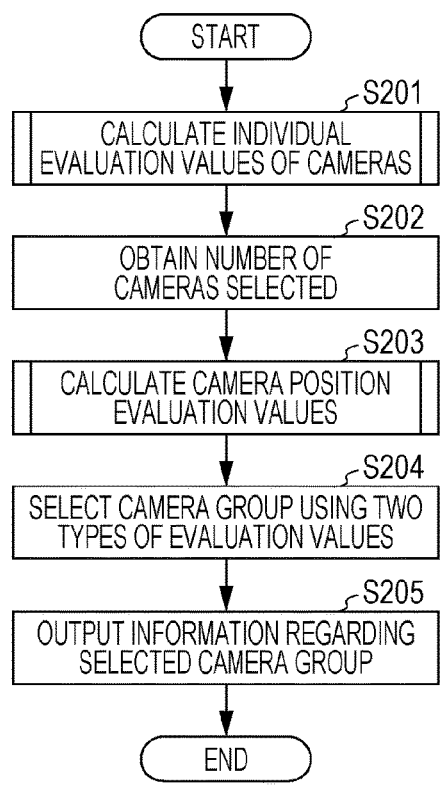
FIG. 22 is a flowchart illustrating the process for initially selecting cameras according to the embodiment.

Details and another example of the process for initially selecting cameras described with reference to FIG. 6 will be described hereinafter. FIG. 22 is a flowchart illustrating the process for initially selecting cameras.

First, the initial camera selection unit 115 calculates individual evaluation values of cameras (S201). The initial camera selection unit 115 then selects a main camera on the basis of the calculated evaluation values. More specifically, the initial camera selection unit 115 selects a camera having a largest evaluation value as a main camera.

Next, the initial camera selection unit 115 obtains the number of cameras selected (S202). The initial camera selection unit 115, for example, obtains the number of cameras specified by the user 106 or a predetermined number of cameras.

Next, the initial camera selection unit 115 calculates combined evaluation values (camera position evaluation values) on the basis of positions of the cameras (S203). More specifically, the initial camera selection unit 115 calculates the evaluation value for each combination of the main camera and (the number of cameras selected−1) sub-cameras on the basis of the positions of the cameras.

Next, the initial camera selection unit 115 selects a camera group using the individual evaluation values of the cameras calculated in step S201 and the camera position evaluation values calculated in step S203 (S204). More specifically, the initial camera selection unit 115 selects cameras having highest total evaluation values, which are obtained from the two types of evaluation values.

The initial camera selection unit 115, for example, calculates a product of a sum of the individual evaluation values of cameras included in the selected camera group and the camera position evaluation value of the camera group as a total evaluation value. A method for calculating a total evaluation value is not limited to this, but may be an arbitrary method such as weight addition, instead.

Finally, the initial camera selection unit 115 outputs information regarding a selected camera group (S205).

Although the initial camera selection unit 115 selects a main camera and then makes a determination for a camera group including the selected main camera on the basis of total evaluation values here, the initial camera selection unit 115 may obtain a combination having a highest total evaluation value and then select one of cameras, which are included in the combination, having a highest evaluation value as a main camera, instead.

Figure 23:
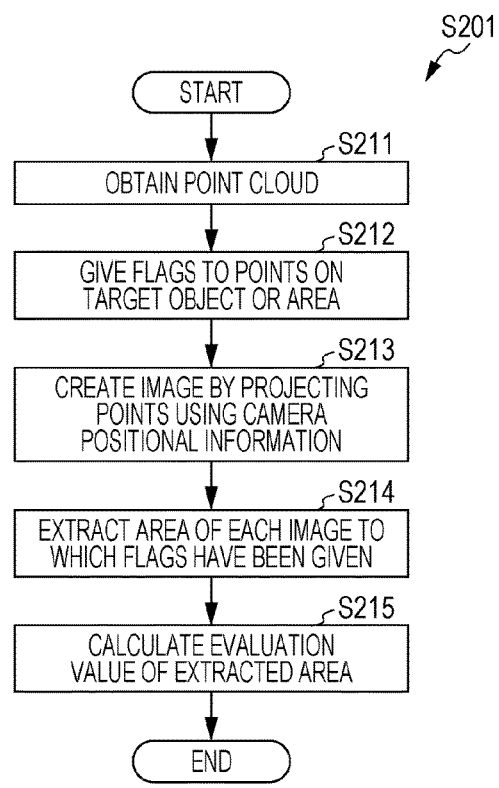
FIG. 23 is a flowchart illustrating a process for calculating individual evaluation values of cameras according to the embodiment.

The process for calculating individual evaluation values of cameras (S201 in FIG. 22) will be described hereinafter. FIG. 23 is a flowchart illustrating the process for calculating individual evaluation values of cameras.

First, the initial camera selection unit 115 obtains a point cloud (S211). The point cloud includes a reconfigured three-dimensional model and camera positional information.

Next, the initial camera selection unit 115 gives flags to points on a subject (target object) or a target area in the three-dimensional model (S212).

Figure 24:
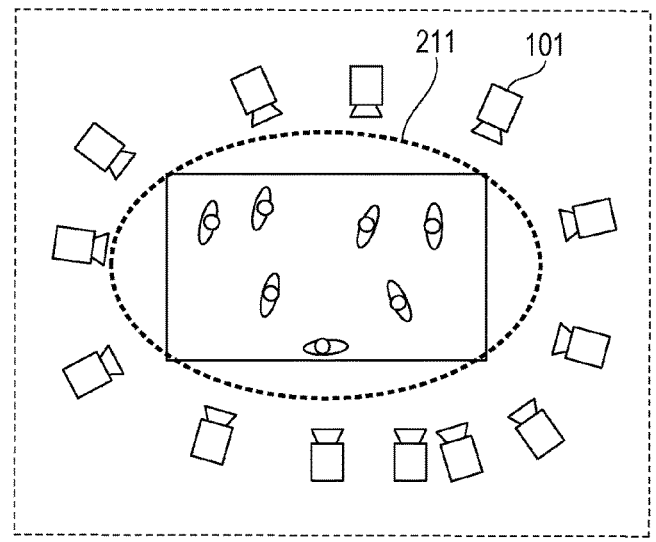
FIG. 24 is a diagram illustrating an example of selection of a target space according to the embodiment.
Figure 25:
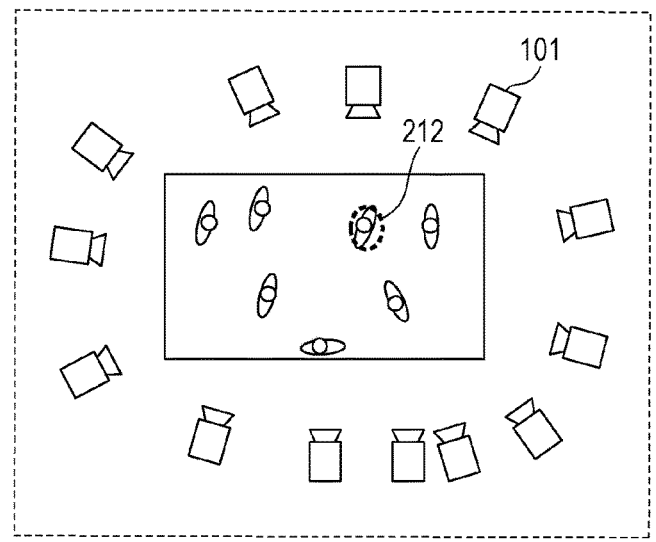
FIG. 25 is a diagram illustrating an example of selection of a subject according to the embodiment.

FIG. 24 is a diagram illustrating an example of selection of a target area 211. FIG. 25 is a diagram illustrating an example of selection of a subject 212. As a method for selecting a subject or a target area, a method in which the user 106 manually selects a subject or a target area or a method in which a subject or a target area is automatically selected may be used.

If the user 106 manually selects the subject 212 or the target area 211, the user 106 selects the subject 212 or the target area 211 through the UI. The initial camera selection unit 115 projects the selected subject 212 or target area 211 in a two-dimensional plane onto a three-dimensional model to select the subject 212 or the subject 212 in the three-dimensional model.

If the subject 212 or the target area 211 is automatically selected and the server 103 has obtained map information in advance, the initial camera selection unit 115 selects an important security area such as an exit as the target area 211. Alternatively, the initial camera selection unit 115 automatically detects a suspicious person through attitude recognition or the like and selects the suspicious person as the subject 212.

If the server 103 has not obtained map information in advance, the initial camera selection unit 115 determines that a most crowded area is important, and determines the most crowded area as the target area 211. Alternatively, the initial camera selection unit 115 automatically detects a suspicious person through attitude recognition or the like and selects the suspicious person as the subject 212.

Next, the initial camera selection unit 115 creates an image by projecting the points onto the two-dimensional plane using the camera positional information (S213).

Next, the initial camera selection unit 115 extracts an area of each image to which the flags have been given (S214).

Next, the camera information calculation unit 114 calculates an evaluation value of the extracted area of each image to calculate an evaluation value of each image (camera) (S215).

The initial camera selection unit 115, for example, increases the evaluation value if the extracted area in each image is large. Alternatively, the camera switching determination unit 116 may increase the evaluation value if a visible area is large. The visible area refers to an area of each image in which the extracted area can be actually recognized. If there is an object or the like in front of the target area 211 or the subject 212, the visible area becomes small. Alternatively, the initial camera selection unit 115 may give priority to each portion of the target area 211 or the subject 212 and increase the evaluation value if many portions of high priority are included in an image or a portion of high priority included in an image is large. The initial camera selection unit 115 may increase the evaluation value, for example, if a face of the subject 212 is included in an image. Alternatively, the initial camera selection unit 115 may increase the evaluation value if each image is vivid or distortion in each image is small.

Figure 26:
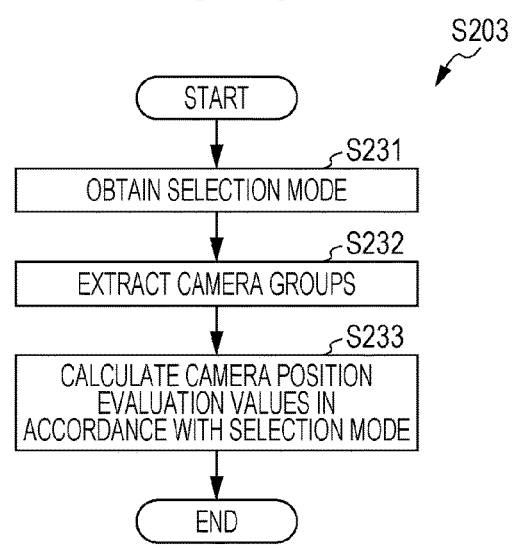
FIG. 26 is a flowchart illustrating a process for calculating camera position evaluation values according to the embodiment.

The process for calculating camera position evaluation values (S203 in FIG. 22) will be described hereinafter. FIG. 26 is a flowchart illustrating the process for calculating camera position evaluation values.

First, the initial camera selection unit 115 obtains a selection mode (S231). The selection mode may be a discrete angle mode or a particular angle mode. The camera switching determination unit 116 obtains a selection mode specified by the user 106 or a predetermined selection mode.

Figure 27:
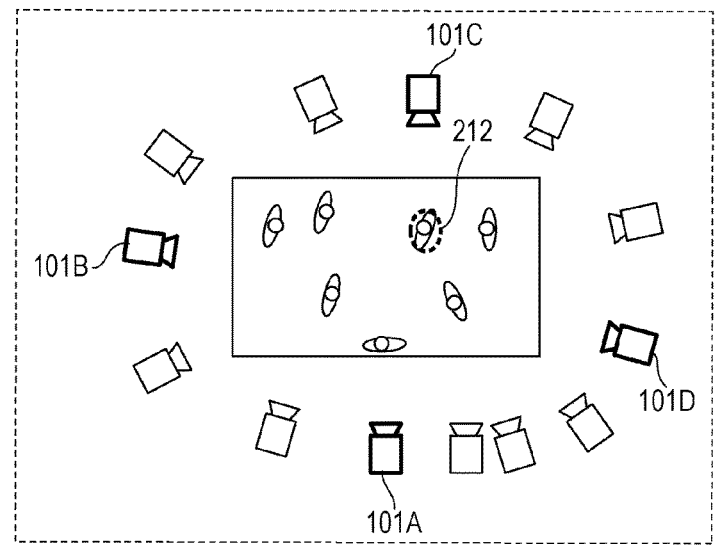
FIG. 27 is a diagram illustrating an example of selection of cameras in a discrete angle mode according to the embodiment.
Figure 28:
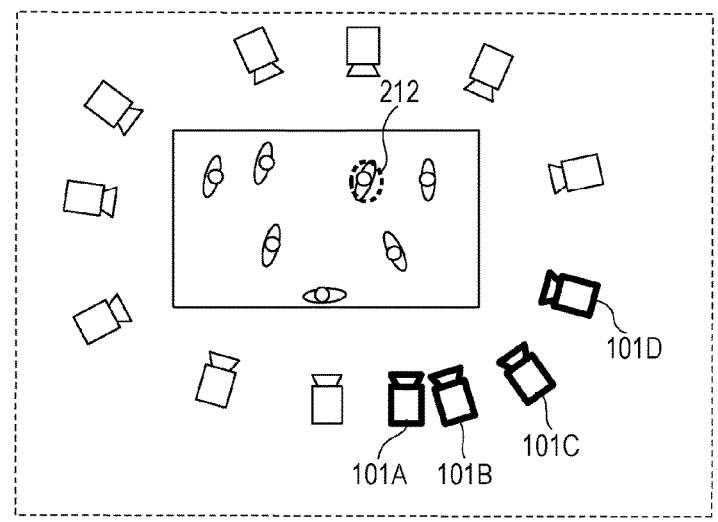
FIG. 28 is a diagram illustrating an example of selection of cameras in a particular angle mode according to the embodiment.

As illustrated in FIG. 27, in the discrete angle mode, cameras 101A to 101D capturing images of the subject 212 (or the target area 211) from various angles at regular intervals are selected. As illustrated in FIG. 28, in the particular angle mode, cameras 101A to 101D capturing images of the subject 212 (or the target area 211) from a particular angle are selected. The discrete angle mode is effective, for example, in a stadium where seats surround a court or a field. The particular angle mode is effective in a concert hall where seats are provided in one direction of a stage or when the user 106 desires to watch a game or a concert from a particular angle.

Next, the initial camera selection unit 115 selects a plurality of camera groups, each including a selected number of cameras (S232). Next, the initial camera selection unit 115 calculates a camera position evaluation value of each camera group in accordance with the selection mode (S233).

More specifically, in the discrete angle mode, the initial camera selection unit 115 determines the camera position evaluation value in accordance with whether the plurality of cameras are arranged at regular intervals relative to a target representative point. More specifically, the initial camera selection unit 115 increases the evaluation value if the plurality of cameras are arranged at regular intervals. If a ratio of an area of the subject 212 to an area of the entirety of an image is higher than a certain value, the initial camera selection unit 115 may give priority to the positional information. That is, the initial camera selection unit 115 may decrease the evaluation value if a camera is too close to the subject 212.

In the particular angle mode, the initial camera selection unit 115 determines the camera position evaluation value in accordance with how closely the plurality of cameras are arranged to one another in a specified angle. More specifically, the initial camera selection unit 115 increases the evaluation value if the plurality of cameras are arranged close to one another in the specified angle.

The initial camera selection unit 115 may take into consideration an attitude of the subject 212 (an angle of the face or the like) and increase the evaluation value if the subject 212 faces a camera. In this case, the attitude of the subject 212 can be detected through face recognition or the like.

As a method for extracting a camera group (S232) and calculating the camera position evaluation values (S233), one of the following methods may be used.

That is, the initial camera selection unit 115 extracts all combinations of cameras as camera groups. Alternatively, the initial camera selection unit 115 may classify a plurality of cameras such that similar cameras (e.g., close to one another) are classified into the same class, and extract all combinations of cameras representing all classes as camera groups. Alternatively, the initial camera selection unit 115 may select a main camera on the basis of the evaluation values of the cameras and extract all combinations of cameras including the main camera as camera groups.

As a method for switching cameras in a time direction, the following method may be used. That is, the camera switching determination unit 116 stores information regarding a camera group selected in the past. The camera switching determination unit 116 stores a camera group evaluation value at each time and determines whether to switch the camera group. At this time, a parameter for controlling a switching frequency in the time direction is prepared, and the camera switching determination unit 116 determines whether to switch the camera group using the parameter. More specifically, the camera switching determination unit 116 uses the parameter to perform control such that when time elapsed since a previous switching operation is short, switching is not performed. When the time elapsed since the previous switching operation is shorter than a first time, for example, the camera switching determination unit 116 may determine that switching is not to be performed. When the time elapsed since the previous switching operation is equal to or longer than the first time but shorter than a second time, the camera switching determination unit 116 may make a determination in accordance with a first criterion. When the time elapsed since the previous switching operation is longer than the second time, the camera switching determination unit 116 may make a determination in accordance with a second criterion (the camera group is more likely to be switched).

Although the server 103 performs camera switching and resetting as necessary after the process for initially selecting cameras (S111) in the example illustrated in FIG. 5, the server 103 may repeatedly perform the process for initially selecting cameras at certain time intervals. In this case, too, the above-mentioned parameter may be used to perform control such that switching is not performed too frequently.

Figure 29:
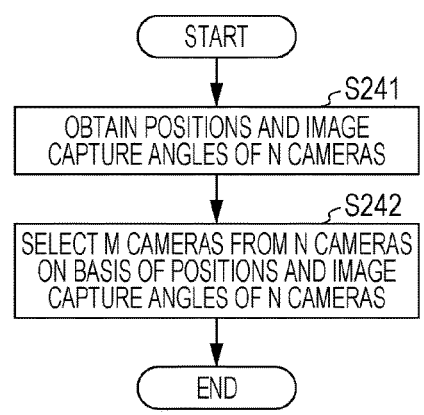
FIG. 29 is a flowchart illustrating a method for selecting cameras according to the embodiment.

As described above, the method for selecting cameras according to the present embodiment is a method for selecting cameras in which M (M is a natural number smaller than N) cameras 101 (selected cameras) capturing images to be displayed are selected from N (N is a natural number equal to or larger than 2) cameras 101 capturing the same scene. In this method, a process illustrated in FIG. 29 is performed.

First, the server 103 obtains positions and image capture angles of the N cameras 101 (S241). More specifically, the server 103 calculates the positions and image capture angles of the N cameras 101 by performing three-dimensional reconfiguration using images captured by the N cameras 101. Alternatively, the server 103 calculates the positions and image capture angles of the N cameras 101 using information obtained by sensors (e.g., the GPS, Wi-Fi, or gyro sensors) included in the N cameras 101 and transmitted from the N cameras 101.

Next, the server 103 selects M cameras 101 from the N cameras 101 on the basis of the obtained positions and image capture angles of the N cameras 101 (S242). More specifically, the server 103 selects M cameras 101 on the basis of the positions and image capture angles of the N cameras 101 such that the M cameras 101 can capture images of a target space without a blind spot. That is, the server 103 selects, on the basis of the positions and image capture angles of the N cameras 101, M cameras 101 whose images hardly overlap with one another and whose images include the target space most comprehensively. Alternatively, the server 103 selects, on the basis of the positions and image capture angles of the N cameras 101, M cameras 101 capturing images of the target space or a subject from a plurality of angles at regular intervals.

The server 103 may also obtain focal distances of the N cameras 101 in step S241 and select M cameras 101 from the N cameras 101 in step S242 on the basis of the obtained positions, image capture angles, and focal distances of the N cameras 101.

According to the method for selecting cameras, appropriate cameras can be automatically selected from a plurality of cameras on the basis of positions and image capture angles of the plurality of cameras.

As illustrated in FIG. 5, the server 103 also determines whether to switch some of the selected M cameras 101 to other cameras (S112) in a frame after step S242 (S111). More specifically, as illustrated in FIG. 8, the server 103 tracks the subject over frames and, if the tracking of the subject fails, determines that a selected camera 101 is to be switched. Even more specifically, the server 103 associates three-dimensional models of the subject between frames and projects the associated three-dimensional models of the subject onto a present frame. If the subject is not included in an obtained frame, the server 103 determines that the tracking has failed (S147).

If the server 103 determines in step S112 that some cameras 101 are to be switched (YES in S112), the server 103 selects new cameras for the cameras 101 on the basis of the positions and image capture angles of the N cameras 101 (S114).

The server 103 also determines whether to perform the processing in step S242 (S111) again in a frame after step S242 (S111) (S115). If the server 103 determines in step S115 that the processing in step S242 (S111) is to be performed again (YES in S115), the server 103 selects M cameras 101 from the N cameras 101 on the basis of the positions and image capture angles of the N cameras 101 (S111).

In step S112, the server 103 may determine that some cameras 101 are to be switched if time elapsed since a previous switching operation is shorter than the first time. The server 103 may determine, in accordance with the first criterion, whether to switch some cameras 101 to other cameras if the time elapsed since the previous switching operation is equal to or longer than the first time but shorter than the second time, which is longer than the first time. The server 103 may determine whether to switch some cameras 101 to other cameras in accordance with the second criterion, according to which the cameras 101 are more likely to be switched than when the first criterion is used, if the time elapsed since the previous switching operation is equal to or longer than the second time.

As illustrated in FIG. 22, in step S242 (S111), the server 103 calculates first evaluation values of the N cameras 101 (individual evaluation values of the cameras 101) on the basis of the images captured by the N cameras 101 (S201). The server 103 also calculates second evaluation values (camera position evaluation values) of camera groups, which are combinations of M cameras 101 included in the N cameras 101, on the basis of the position and image capture angles of the cameras 101 (S203). The server 103 then calculates a third evaluation value of each camera group on the basis of the first evaluation values of the M cameras 101 included in each camera group and the second evaluation value of each camera group and selects the M cameras 101 included in a camera group having a highest third evaluation value (S204).

Although the method for selecting cameras and the image distribution system according to the embodiment have been described, the present disclosure is not limited to the embodiment.

Each processing unit included in each apparatus included in the image distribution system according to the embodiment is achieved through large-scale integration (LSI), which is typically embodied as an integrated circuit. Each processing unit may be realized as a chip, or some or all of the processing units may be realized as a chip.

An integrated circuit need not be obtained through LSI, but may be a dedicated circuit or a general-purpose processor. A field-programmable gate array (FPGA) for which programming can be performed after an LSI circuit is fabricated or a reconfigurable processor capable of reconfiguring connections and settings of circuit cells of an LSI circuit may be used, instead.

In the above embodiment, each component may be achieved by dedicated hardware or a software program suitable for each component. Each component may be achieved by a program execution unit such as a central processing unit (CPU) or a processor that reads and executes a software program stored in a storage medium such as a hard disk or a semiconductor memory, instead.

In other words, each apparatus included in the image distribution system includes processing circuitry and a storage (can be accessed from the processing circuitry) electrically connected to the processing circuitry. The processing circuitry includes at least either dedicated hardware or a program execution unit. If the processing circuitry includes a program execution unit, the storage is used for storing a software program executed by the program execution unit. The processing circuitry executes the method for selecting cameras according to the embodiment using the storage.

Furthermore, the present disclosure may be implemented as the software program or a non-transitory computer-readable storage medium storing the software program. The software program can obviously be distributed through a communication medium such as the Internet.

Numbers in the above description are examples used for specifically describing the present disclosure, and the present disclosure is not limited by such numbers.

Order of the steps included in the method for selecting cameras or the like are examples used for specifically describing the present disclosure, and the order of the steps may be different from that described above. Some of the steps may be performed at the same time as (in parallel with) other steps.

Although the image distribution system and the method for selecting cameras according to one or a plurality of aspects of the present disclosure have been described on the basis of the embodiment, the present disclosure is not limited to the embodiment. Modes obtained by modifying the embodiment in various ways that can be conceived those skilled in the art and modes obtained by combining components described in different embodiments may be included in the one or plurality of aspects of the present disclosure insofar as the scope of the present disclosure is not deviated from.

The present disclosure can be applied to an image distribution system that distributes images captured by a plurality of cameras.

What is claimed is:

1. A method, comprising:
obtaining, using sensors included in a first number of cameras capturing images of a same scene, positions and image capture angles of the cameras;
selecting, for display, a second number of the cameras capturing the images by using a processor based on the positions and the image capture angles of the cameras;
determining whether to switch at least one of the second number of the cameras to another camera in a frame after the selecting; and
selecting, when the determining determines that the at least one of the second number of the cameras is to be switched, a new camera for the at least one of the second number of the cameras based on the positions and the image capture angles of the N cameras,
wherein the first number is a natural number at least equal to 2,
the second number is a natural number less than the first number, and
in the determining:
when a time elapsed since a previous switching operation is shorter than a first time, the at least one of the second number of the cameras is determined not to be switched to another camera;
when the time elapsed since the previous switching operation is equal to or longer than the first time but shorter than a second time longer than the first time, whether to switch the at least one of the second number of the cameras to another camera is determined in accordance with a first criterion; and
when the time elapsed since the previous switching operation is equal to or longer than the second time, whether to switch the at least one of the second number of the cameras to another camera is determined in accordance with a second criterion, the at least one of the second number of the cameras being more likely to be switched to the another camera according to the second criterion than the first criterion.

2. The method according to claim 1,
wherein, in the selecting, cameras whose images hardly overlap with one another and whose images include a target space most comprehensively are selected as the second number of the cameras based on the positions and the image capture angles of the cameras.

3. The method according to claim 1,
wherein, in the selecting, cameras capturing images of a target space or a subject from a plurality of angles at regular intervals are selected as the second number of the cameras based on the positions and the image capture angles of the cameras.

4. The method according to claim 1,
wherein, in the obtaining, the positions and the image capture angles of the cameras are calculated by performing three-dimensional reconfiguration using the images captured by the cameras.

5. The method according to claim 1,
wherein, in the obtaining, the positions and the image capture angles of the cameras are calculated using information obtained by the sensors included in the cameras and transmitted from the cameras.

6. The method according to claim 1,
wherein, in the obtaining, focal distances of the cameras are also obtained, and
in the selecting, the second number of the cameras is selected based on the positions, the image capture angles, and the focal distances of the cameras.

7. The method according to claim 1,
wherein, in the determining, a subject is tracked over frames and, when tracking of the subject fails, the at least one of the second number of the cameras is determined to be switched in accordance with the first time and the second time.

8. The method according to claim 7,
wherein, in the determining, three-dimensional models of the subject are associated with one another between the frames, the associated three-dimensional models of the subject are projected onto a present frame, and, when the subject is not included in an obtained frame, the tracking of the subject fails.

9. The method according to claim 1, further comprising:
determining whether to perform the selecting again in the frame after the selecting; and
selecting, when the selecting is determined to be performed again, the second number of the cameras again based on the positions and the image capture angles of the cameras.

10. The method according to claim 1,
wherein the selecting includes:
calculating first evaluation values of the cameras based on the images captured by the cameras;
calculating second evaluation values of camera groups, which are combinations of the second number of the cameras, based on the positions and the image capture angles of the cameras;
calculating a third evaluation value of each camera group based on the first evaluation values of the second number of the cameras included in each camera group and the second evaluation value of each camera group; and
selecting the second number of the cameras from a camera group having a highest third evaluation value.

11. An image distribution system, comprising:
a processor; and
a memory including a program, the program causing the processor to execute operations including:
obtaining, using sensors included in a first number of cameras capturing images of a same scene, positions and image capture angles of the cameras;
selecting, for display, a second number of the cameras capturing the images based on the positions and the image capture angles of the cameras;
determining whether to switch at least one of the second number of the cameras to another camera in a frame after the selecting; and
selecting, when the determining determines that the at least one of the second number of the cameras is to be switched, a new camera for the at least one of the second number of the cameras based on the positions and the image capture angles of the cameras,
wherein the first number is a natural number at least equal to 2,
the second number is a natural number less than the first number, and
in the determining:
when a time elapsed since a previous switching operation is shorter than a first time, the at least one of the second number of the cameras is determined not to be switched to another camera;

when the time elapsed since the previous switching operation is equal to or longer than the first time but shorter than a second time longer than the first time, whether to switch the at least one of the second number of the cameras to another camera is determined in accordance with a first criterion; and when the time elapsed since the previous switching operation is equal to or longer than the second time, whether to switch the at least one of the second number of the cameras to another camera is determined in accordance with a second criterion, the at least one of the second number of the cameras being more likely to be switched to the another camera according to the second criterion than the first criterion.

12. A method, comprising:

obtaining positions and image capture angles of a first number of cameras capturing images of a same scene;

selecting, for display, a second number of the cameras capturing the images based on the positions and the image capture angles of the N cameras;

determining whether to switch at least one of the second number of the cameras to another camera in a frame after the selecting; and selecting, when the determining determines that the at least one of the second number of the cameras is to be switched, a new camera for the at least one of the second number of the cameras based on the positions and the image capture angles of the N cameras, wherein the first number is a natural number at least equal to 2, the second number is a natural number less than the first number, and in the determining:

when a time elapsed since a previous switching operation is shorter than a first time, the at least one of the second number of the cameras is determined not to be switched to another camera;

when the time elapsed since the previous switching operation is equal to or longer than the first time but shorter than a second time longer than the first time, whether to switch the at least one of the second number of the cameras to another camera is determined in accordance with a first criterion; and when the time elapsed since the previous switching operation is equal to or longer than the second time, whether to switch the at least one of the second number of the cameras to another camera is determined in accordance with a second criterion, the at least one of the second number of the cameras being more likely to be switched to the another camera according to the second criterion than the first criterion.

13. A method, comprising:

obtaining, using sensors included in a first number of cameras capturing images of a same scene, positions and image capture angles of the cameras;

selecting, for display, a second number of the cameras capturing the images by using a processor based on the positions and the image capture angles of the cameras, wherein the first number is a natural number at least equal to 2, the second number is a natural number less than the first number, and the selecting includes:

calculating first evaluation values of the cameras based on the images captured by the cameras;

calculating second evaluation values of camera groups, which are combinations of the second number of the cameras, based on the positions and the image capture angles of the cameras;

calculating a third evaluation value of each camera group based on the first evaluation values of the second number of the cameras included in each camera group and the second evaluation value of each camera group; and selecting the second number of the cameras from a camera group having a highest third evaluation value.

14. An image distribution system, comprising:

a processor; and a memory including a program, the program causing the processor to execute operations including:

obtaining, using sensors included in a first number of cameras capturing images of a same scene, positions and image capture angles of the cameras;

selecting, for display, a second number of the cameras capturing the images based on the positions and the image capture angles of the cameras;

wherein the first number is a natural number at least equal to 2, the second number is a natural number less than the first number, and the selecting includes:

calculating first evaluation values of the cameras based on the images captured by the cameras;

calculating second evaluation values of camera groups, which are combinations of the second number of the cameras, based on the positions and the image capture angles of the cameras;

calculating a third evaluation value of each camera group based on the first evaluation values of the second number of the cameras included in each camera group and the second evaluation value of each camera group; and selecting the second number of the cameras from a camera group having a highest third evaluation value.

15. A method, comprising:

obtaining positions and image capture angles of a first number of cameras capturing images of a same scene; and selecting, for display, a second number of the cameras capturing the images based on the positions and the image capture angles of the N cameras, wherein the first number is a natural number at least equal to 2, the second number is a natural number less than the first number, and the selecting includes:

calculating first evaluation values of the cameras based on the images captured by the cameras;

calculating second evaluation values of camera groups, which are combinations of the second number of the cameras, based on the positions and the image capture angles of the cameras;

calculating a third evaluation value of each camera group based on the first evaluation values of the second number of the cameras included in each camera group and the second evaluation value of each camera group; and selecting the second number of the cameras from a camera group having a highest third evaluation value.

\* \* \* \* \*